(12) United States Patent
Yamaguchi et al.

(10) Patent No.: US 8,541,339 B2
(45) Date of Patent: Sep. 24, 2013

(54) REVERSIBLE THERMOSENSITIVE RECORDING MEDIUM AND METHOD FOR PRODUCING THE SAME

(75) Inventors: Koji Yamaguchi, Shizuoka (JP); Noboru Koga, Tokyo (JP); Takeshi Owashi, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/372,806

(22) Filed: Feb. 14, 2012

(65) Prior Publication Data
US 2012/0208697 A1    Aug. 16, 2012

(30) Foreign Application Priority Data
Feb. 16, 2011    (JP) .................... 2011-031238

(51) Int. Cl.
*B41M 5/41*    (2006.01)
*B41M 5/42*    (2006.01)

(52) U.S. Cl.
USPC ............ 503/201; 427/152; 503/200; 503/226

(58) Field of Classification Search
None
See application file for complete search history.

(56) References Cited

FOREIGN PATENT DOCUMENTS
JP    11-11060    1/1999
JP    2009-173013    8/2009

*Primary Examiner* — Bruce H Hess
(74) *Attorney, Agent, or Firm* — Cooper & Dunham LLP

(57) ABSTRACT

A reversible thermosensitive recording medium including: reversible thermosensitive recording layer; first sheet-shaped base; second sheet-shaped base; first resin layer; second resin layer; and electronic information recording module containing module substrate, and electronic information recording element and antenna circuit disposed on the substrate, wherein the recording layer is provided adjacent to the first sheet-shaped base; the first or second sheet-shaped base has concave portion in which the element is disposed in depth direction thereof; the module is provided between the first and second sheet-shaped bases, where the first resin layer is provided between the module and the sheet-shaped base having the concave portion and the second resin layer is provided between the module and the sheet-shaped base having no concave portion; and inner side surface of the concave portion is tapered surface where maximum opening diameter of the concave portion decreases from opening edge thereof towards bottom surface thereof.

9 Claims, 13 Drawing Sheets

REVERSIBLE THERMOSENSITIVE RECORDING MEDIUM AND METHOD FOR PRODUCING THE SAME

BACKGROUND OF THE INVENTION

1. Field of the Invention

The present invention relates to a reversible thermosensitive recording medium and a method for producing the reversible thermosensitive recording medium.

2. Description of the Related Art

IC cards have been increasingly used in various aspects from users' daily lives to business activities. Actually, they are used as various cards (e.g., cash cards, credit cards, prepaid cards and ETC cards (electronic toll collection system)); in transportation facilities (e.g., railways and buses); as affiliate cards for digital broadcasting, 3rd generation mobile phones, etc.; in library service counters; and as student ID cards, employee ID cards, basic resident register cards, etc. Meanwhile, the amount of IC cards disposed of has been being increasing in accordance with diversification of the current economic and social activities.

In view of this, there is a keen need to create a recycling society, where material consumption is reduced and less environmental load is given, by reconsidering the current economic societies and lifestyles involving mass production, mass consumption and mass disposal to promote effective utilization and recycling of materials.

As one promising measure, electronic information recording module-embedded reversible thermosensitive recording media, wherein the electronic information recording module includes an electronic information recording element (hereinafter may be referred to as an "IC chip") and an antenna circuit, can be used for reducing the amount of products disposed of. This is because they can rewrite information stored in the IC chip, show information as a visible image on their surface, and be used repeatedly.

Such electronic information recording module-embedded reversible thermosensitive recording media have been used in the manufacturing industry as instruction sheets such as operation sheets, parts management sheets and process management sheets. Actually, there is repeatedly performed a cycle including winding an instruction sheet around a rod-like part or inserting it into a card case, and rewriting the content of the instruction sheet.

When an image is formed on or erased from it, a heating device (e.g., thermal head, erase bar, erase roller and erase plate) of the printer is pressed against the instruction sheet. Thus, rewriting of a print image on the instruction sheet (reversible thermosensitive recording medium) must be performed so as not to break the electronic information recording module. Furthermore, desirably, the instruction sheet is flexible and shows a high-quality image.

Moreover, a tag may be bent when the tag placed on a table surface is picked up, and a tag is taken out from a holder. Thus, an IC chip portion in the tag is demanded to have mechanical durability against bending. Additionally, a medium is made flexible so as to improve efficiency of operation, such as picking up the medium.

Furthermore, from the viewpoint of improvement of close-contact properties with a thermal head so as to obtain high quality image, it is important to make a medium flexible.

If the surface of the reversible thermosensitive recording medium has concavo-convex portions and unevenness, a thermal head insufficiently comes into contact with a surface of the reversible thermosensitive recording medium and thus, heat is not sufficiently conducted in the surface thereof due to the heat insulating effect of air. As a result, the reversible thermosensitive recording medium cannot be rapidly cooled, causing failure in color development (unprinted image portion etc.) and a desired color development cannot be obtained in a part which is hard to be rapidly cooled.

Moreover, the thicker reversible thermosensitive recording medium adversely affects flexibility and reduces the number of reversible thermosensitive recording media which can be stacked in a stacker of a printer.

To solve there problems, proposed is a reversible thermosensitive recording medium (rewritable recording medium) including integrated component of a rewritable sheet having a reversible thermosensitive recording layer, and an electronic information recording module having an IC chip and an antenna circuit, wherein a core sheet having an opening mated with the IC chip is bonded using an adhesive between the rewritable sheet and the electronic information recording module (see Japanese Patent Application Laid-Open (JP-A) No. 2009-173013).

However, as sheets for compensating for the unevenness of the electronic information recording element is provided inside of the medium, the reversible thermosensitive recording medium becomes thicker, adversely affecting flexibility and reducing the number of reversible thermosensitive recording media which can be stacked in a stacker of a printer.

As a proposal for reducing the thickness of the reversible thermosensitive recording medium, a reversible thermosensitive recording medium is proposed that includes a module for an IC card having a substrate and an IC chip mounted on the substrate, wherein a concave portion is formed on a surface of a protective member for covering the IC chip, and a gap is formed between the protective member and the IC chip to prevent the protective member from directly contacting with the IC chip (see JP-A No. 11-11060).

However, the concave portion is required to be relatively deep in an attempt to reduce the thickness of the reversible thermosensitive recording medium. The deep concave portion results in large unevenness between the surface of the protective member and the bottom surface of the concave portion. Consequently, a resin is less likely to fill the concave portion completely and bubbles may be left when the resin is applied using an applicator onto the surface of the protective member on which the concave portion has been formed.

The problems are further described below in detail with reference to FIGS. 1A to 1D.

FIGS. 1A to 1D are each schematic view showing a step of applying a resin using an applicator onto a surface of a protective member in which a concave portion has been formed. Firstly, a first sheet-shaped base 3 provided on a reversible thermosensitive recording layer 1 is prepared, and a concave portion 2 having no tapered surface is formed by, for example, cutting out a surface of the first sheet-shaped base 3 opposite to a surface on which the reversible thermosensitive recording layer 1 is provided (see FIG. 1A). Next, a coating liquid for a first resin layer 11 is applied using, for example, an applicator 20 on the concave portion 2 and a surface of the first sheet-shaped base 3 in which the concave portion 2 has been formed (see FIG. 1B). The concave portion 2 having large depth prevents the resin from entering into a left corner of a bottom surface of the concave portion 2 when the applicator 20 passes through a left end of the concave portion 2, causing a gap "a1" to be formed. Similarly, when the applicator 20 approaches a right end of the concave portion 2, a gap "a2" may be left at a right corner of the bottom surface of the concave portion 2 (see FIGS. 1C and 1D).

When the resin in the concave portion 2 is cured and shrunk, a lack of the resin in the gap may deform a portion of the base 3 just under the gap, depressing the surface of the reversible thermosensitive recording layer 1.

Depending on the type of the resin used, the resin may react with residual air within the gap and moisture in the residual air to generate gas within the gap "a1" or "a2", the resulting gas may form concave portions in the reversible thermosensitive recording layer 1.

Such concavo-convex shape of the surface of the reversible thermosensitive recording layer 1 results in white voids and failure in color development upon image formation using a thermal head.

SUMMARY OF THE INVENTION

An object of the present invention is to provide: a reversible thermosensitive recording medium, which is thin and has excellent flexibility, and does not cause failure in color development after repetitive image formation and erasure, nor failure in color development upon the first image formation; and a method for producing the reversible thermosensitive recording medium.

Means for solving the above problems pertinent in the art are as follows:

A reversible thermosensitive recording medium including:
a reversible thermosensitive recording layer;
a first sheet-shaped base;
a second sheet-shaped base;
a first resin layer;
a second resin layer; and
an electronic information recording module containing a module substrate and an electronic information recording element and an antenna circuit which are disposed on the module substrate;
wherein the reversible thermosensitive recording layer is provided adjacent to the first sheet-shaped base;
wherein the first sheet-shaped base or the second sheet-shaped base has a concave portion in which the electronic information recording element is disposed in a depth direction of the first sheet-shaped base or the second sheet-shaped base,
wherein the electronic information recording module is provided between the first sheet-shaped base and the second sheet-shaped base, where the first resin layer is provided between the electronic information recording module and the sheet-shaped base having the concave portion and the second resin layer is provided between the electronic information recording module and the sheet-shaped base having no concave portion, and
wherein an inner side surface of the concave portion is a tapered surface where the maximum opening diameter of the concave portion decreases from an opening edge of the concave portion towards a bottom surface of the concave portion.

According to the present invention, the above-mentioned problems in related arts can be solved and the object can be achieved by a reversible thermosensitive recording medium, which is thin and has excellent flexibility, and does not cause failure in color development after repetitive image formation and erasure, as well as failure in color development upon the first image formation, and a method for producing the reversible thermosensitive recording medium.

Figure 1A:
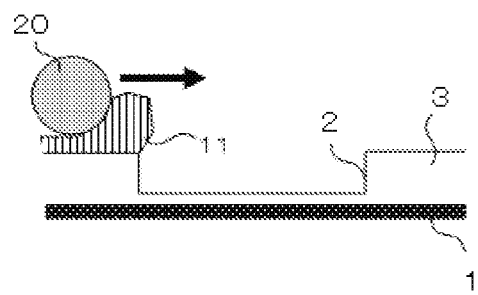
FIGS. 1A to 1D are each schematic view showing a step of applying a resin using an applicator on a concave portion of a first sheet-shaped base according to a related art.
Figure 1B:
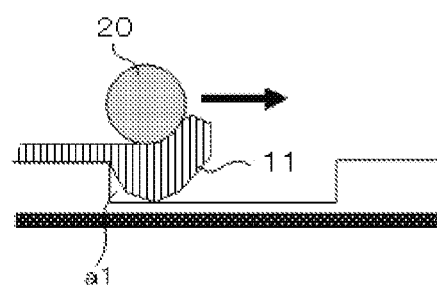
Figure 1C:
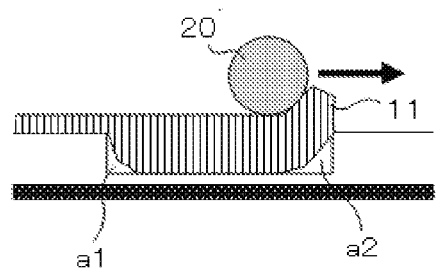
Figure 1D:
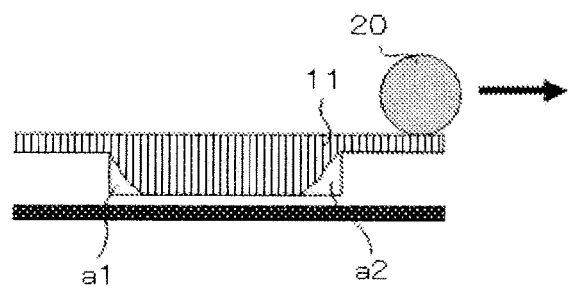

DETAILED DESCRIPTION OF THE INVENTION (Reversible Thermosensitive Recording Medium)

A reversible thermosensitive recording medium of the present invention includes at least a reversible thermosensitive recording layer, a first sheet-shaped base, a second sheet-shaped base, and an electronic information recording module, and if necessary includes other members.

In the reversible thermosensitive recording medium, the reversible thermosensitive recording layer is provided adjacent to the first sheet-shaped base; the first sheet-shaped base or the second sheet-shaped base has a concave portion in which the electronic information recording element is disposed in a depth direction of the first sheet-shaped base or the second sheet-shaped base; the electronic information recording module is provided between the first sheet-shaped base and the second sheet-shaped base, where the first resin layer is provided between the electronic information recording module and the sheet-shaped base having the concave portion and the second resin layer is provided between the electronic information recording module and the sheet-shaped base having no concave portion; and an inner side surface of the concave portion is a tapered surface where the maximum opening diameter of the concave portion decreases from an opening edge of the concave portion towards a bottom surface of the concave portion.

<Reversible Thermosensitive Recording Layer>

The reversible thermosensitive recording layer reversibly changes in color tone and contains a reversible thermosensitive recording material reversibly changing in color depending on change in temperature. The reversible thermosensitive recording material changes in color as a result of changing in combination, for example, of light transmittance, light reflectance, light absorption wavelength and light scattering degree.

The reversible thermosensitive recording material is not particularly limited, as long as it can reversibly change in transparency or color tone by heat, and can be appropriately selected depending on the purpose. Examples of the reversible thermosensitive recording material include those which turn into a first color at a first temperature higher than ambient temperature and turn into a second color after heating at a second temperature higher than the first temperature and then cooling. The reversible thermosensitive recording material which turns into another color at first and second temperatures is particularly preferable.

Specific examples include a material which becomes transparent at a first temperature and becomes opaque at a second temperature (see JP-A No. 55-154198), a material which develops color at a second temperature and becomes colorless at a first temperature (see JP-A Nos. 04-224996, 04-247985 and 04-267190), a material which becomes opaque at a first temperature and becomes transparent at a second temperature (see JP-A No. 03-169590), and a material which turns into black, red, blue, etc. at a first temperature and becomes colorless at a second temperature (see JP-A Nos. 02-188293 and 02-188294). Particularly preferred are dispersions of an organic low-molecular-weight material (e.g., higher fatty acids) in a base resin; and mixtures of a leuco dye and a color developer.

The leuco dye is not particularly limited and can be appropriately selected depending on the purpose. Examples of the leuco dye include phthalide compounds, azaphthalide compounds and fluoran compounds. These may be used alone or in combination.

The color developer is not particularly limited and can be appropriately selected depending on the purpose. Examples of the color developer include those disclosed in, for example, JP-A Nos. 05-124360, 06-210954 and 10-95175. These may be used alone or in combination.

The color developer is a compound having, in the molecule thereof, at least one structure allowing a leuco dye to develop color (e.g., a phenolic hydroxyl group, carboxylic acid group and phosphoric acid group) and at least one structure controlling an intermolecular force (e.g., a structure containing a long chain hydrocarbon group). These structures may be linked to each other via a di- or higher polyvalent linking group containing a hetero atom. Also, the long chain hydrocarbon group may have such a linking group and/or an aromatic group.

Examples of such a color developer include those disclosed in, for example, JP-A Nos. 09-290563 and 11-188969. Among them, preferred is at least one compound selected from compounds represented by the following General Formulas (1) and (2). These color developers have much higher sensitivity than conventional color developers, and thus energy applied for image formation can be reduced by about 10% to about 30%. In this case, thermal decomposition of the color developer can be reduced, and less damage is given to the reversible thermosensitive recording medium and the surface thereof. As a result, durability after repetitive use does not degrade, maintaining excellent image quality.

General Formula (1)

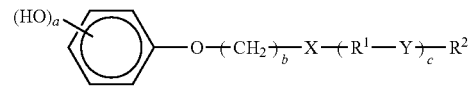

In General Formula (1), X and Y each represent a hetero atom-containing divalent organic group, $R^4$ represents a substituted or unsubstituted divalent hydrocarbon group, $R^2$ represents a substituted or unsubstituted monovalent hydrocarbon group, a is an integer of 1 to 3, b is an integer of 1 to 20, and c is an integer of 0 to 3.

General Formula (2)

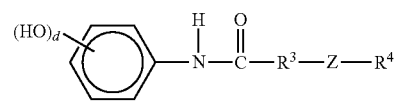

In General Formula (2), Z represents a hetero atom-containing divalent organic group, $R^3$ represents a substituted or unsubstituted divalent hydrocarbon group, $R^4$ represents a substituted or unsubstituted monovalent hydrocarbon group, and d is an integer of 1 to 3.

In General Formulas (1) and (2), as described above, each of X, Y and Z represents a hetero atom-containing divalent organic group, and particularly preferably represents a nitrogen or oxygen atom-containing divalent organic group; e.g., divalent organic groups containing at least one selected from the groups having the following structural formulas.

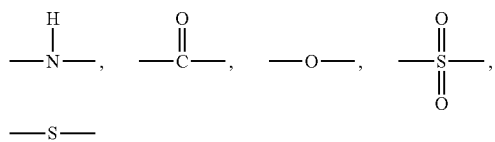

Preferred examples of the hetero atom-containing divalent organic group include those having the following structural formulas.

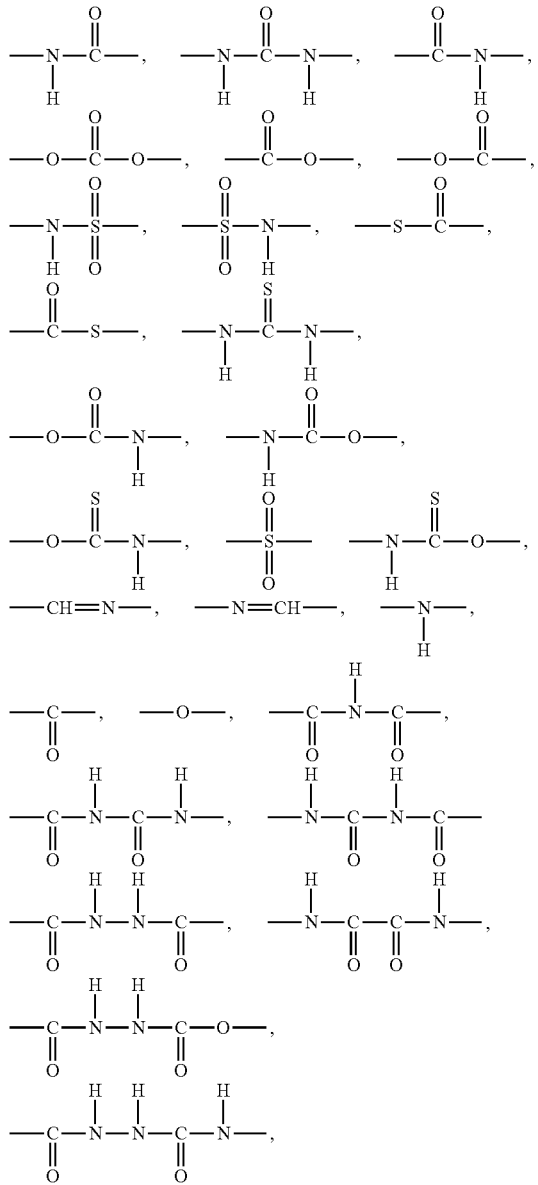

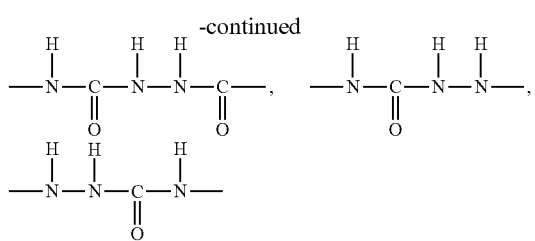

Of these, particularly preferred are those having the following structural formulas.

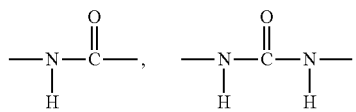

In General Formulas (1) and (2), $R^1$ and $R^3$ each represent a substituted or unsubstituted divalent hydrocarbon group having 1 to 20 carbon atoms.

Preferred groups represented by $R^1$ or $R^3$ are those represented by the following structural formulas:

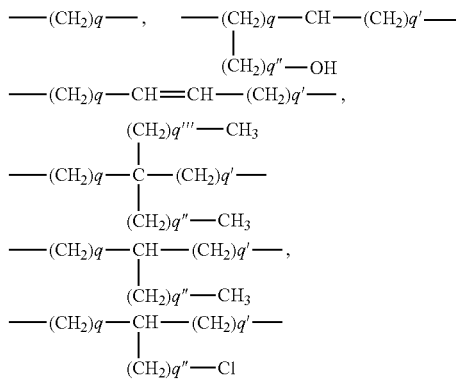

where each of q, q', q" and q'" is an integer satisfying the conditions: the total number of carbon atoms contained in the groups represented by $R^1$ or $R^3$ is 1 to 20. Among them, groups represented by —$(CH_2)_q$— are particularly preferred.

In General Formulas (1) and (2), $R^2$ and $R^4$ each represent a substituted or unsubstituted aliphatic hydrocarbon group having 1 to 24 carbon atoms, preferably 8 to 18 carbon atoms.

The aliphatic hydrocarbon group may be linear or branched, and may have an unsaturated bond. Examples of the substituent linked to the hydrocarbon group include a hydroxyl group, halogen atom and alkoxy group. When the total number of carbon atoms contained in groups $R^1$ and $R^2$ or groups $R^3$ and $R^4$ is 7 or less, stable color development or color erasure deteriorates. Thus, the total number is preferably 8 or more, more preferably 11 or more.

Preferred groups represented by $R^2$ or $R^4$ are those represented by the following structural formulas:

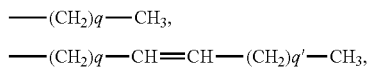

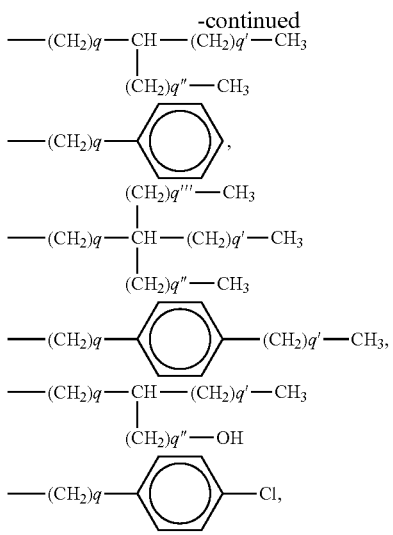

where each of q, q', q" and q'" is an integer satisfying the conditions: the total number of carbon atoms contained in the groups represented by $R^2$ or $R^4$ is 1 to 24. Among them, groups represented by —$(CH_2)_q$—$CH_3$ are particularly preferred.

If necessary, the reversible thermosensitive recording layer may contain an additive for improving and/or controlling coating property of a coating liquid therefor and color developability/erasability thereof. Examples of the additive include surfactants, conductivity-imparting agents, fillers, antioxidants, color development stabilizers and color erasure promoter.

The reversible thermosensitive recording layer preferably contains a leuco dye, a color developer and an additive together with a binder resin. The binder resin is not particularly limited, so long as it can bond the leuco dye, the color developer and the additive onto the first sheet-shaped base. Preferred examples of the binder resin include resins curable using heat, ultraviolet (UV) ray, electron beam (EB) for improving durability after repetitive use. Particularly preferred are thermally-curable resins using a curing agent. These resins can increase a gel ratio of the reversible thermosensitive recording layer.

The thermally-curable resin is not particularly limited and can be appropriately selected depending on the purpose. Examples of the thermally-curable resin include acryl polyol resins, polyester polyol resins, polyurethane polyol resins, polyvinyl butyral resins, cellulose acetate propionate and cellulose acetate butyrate.

The curing agent is not particularly limited and can be appropriately selected depending on the purpose. Preferably, isocyanates are used. Examples of the isocyanate include hexamethylene diisocyanate (HDI), tolylene diisocyanate (TDI), xylylene diisocyanate (XDI) and isophorone diisocyanate (IPDI); an adduct type, burette type, isocyanurate type formed between trimethylolpropane, etc. and the above isocyanates; and blocked products of the above isocyanates. Among them, preferred are hexamethylene diisocyanate, an adduct type thereof, a burette type thereof and an isocyanurate type thereof. Note that all of the curing agent used does not participate in curing reaction. In other words, the reversible thermosensitive recording layer may contain an unreacted curing agent. Also, curing catalysts may be used for allowing curing reaction to successfully proceed.

The reversible thermosensitive recording layer preferably has a gel ratio of 30% or higher, more preferably 50% or higher, still more preferably 70% or higher. When the gel ratio is lower than 30%, the reversible thermosensitive recording layer may exhibit degraded durability after repetitive use.

Here, the gel ratio can be measured by immersing a coated film in a solvent having a high dissolution capability. Specifically, a reversible thermosensitive recording layer is peeled off from a first sheet-shaped base, followed by weighing (initial mass); and the thus-obtained reversible thermosensitive recording layer is sandwiched between 400-mesh wire gauzes and then immersed in a solvent capable of dissolving an uncured binder resin for 24 hours, followed by drying in vacuum and weighing (mass after drying). From the obtained values, the gel ratio can be calculated using the following Equation 1;

$$\text{Gel ratio}(\%) = (\text{mass after drying})/(\text{initial mass}) \times 100 \quad <\text{Equation 1}>$$

Notably, the mass of components other than the binder resin (e.g., particles of organic low-molecular-weight materials), which are contained in the reversible thermosensitive recording layer, is not taken into account for calculation. When the mass of particles of organic low-molecular-weight materials is not previously obtained, it may be calculated from a mass ratio of the binder resin to the particles of organic low-molecular-weight materials. The mass ratio can be determined based on their specific gravities and a ratio of an area occupied with the binder resin to that occupied with the particles of organic low-molecular-weight materials by observing a unit area of the cross section of the layer through transmission electron microscopy (TEM), scanning electron microscopy (SEM), etc.

In the reversible thermosensitive recording layer, a mass ratio of the binder resin to a color developer is preferably 0.1 to 10. When the mass ratio is less than 0.1, the formed reversible thermosensitive recording layer has insufficient heat resistance; whereas when the mass ratio is more than 10, the density of color developed may decrease.

The reversible thermosensitive recording layer can be formed through application of a coating liquid prepared by homogeneously dispersing, in a solvent, a leuco dye, a color developer, an additive and a binder resin.

Examples of the solvent include alcohols, ketones, ethers, glycol ethers, esters, aromatic hydrocarbons and aliphatic hydrocarbons.

The coating liquid can be prepared using a disperser such as a paint shaker, a ball mill, an attriter, a three-roll mill, a Kady mill, a sand mill, a Dino mill or a colloid mill. Here, the coating liquid may be prepared by dispersing the above materials in a solvent using a disperser or may be mixing dispersions of the above materials one another. Also, these materials are dissolved in a solvent under heating and then the solution is rapidly or slowly cooled for precipitation.

Examples of coating methods of the coating liquid include blade coating, wire bar coating, spray coating, air knife coating, bead coating, curtain coating, gravure coating, kiss coating, reverse roll coating, dip coating or die coating.

The thickness of the reversible thermosensitive recording layer is not particularly limited and can be appropriately selected depending on the purpose. It is preferably 1 μm to 20 μm, more preferably 3 μm to 15 μm. When the thickness is less than 1 μm, the density of color developed may decrease to degrade the contrast of the formed image. Whereas when the thickness is more than 20 μm, position-dependent variation in the amount of heat applied becomes large in the reversible thermosensitive recording layer. Some portions of the recording layer do not develop color since the temperature of the portions does not reach a color developing temperature, potentially resulting in failure to attain a desired color density.

<First Sheet-Shaped Base and Second Sheet-Shaped Base>

The first sheet-shaped base is provided adjacent to the reversible thermosensitive recording layer, and the first sheet-shaped base or the second sheet-shaped base has a concave portion in which the electronic information recording element (IC chip) is disposed in a depth direction of the first sheet-shaped base or the second sheet-shaped base.

Unless the first sheet-shaped base and the second sheet-shaped base are distinguished, the first sheet-shaped base and the second sheet-shaped base are hereinafter simply referred to as a "sheet-shaped base".

The shape, structure and size of the sheet-shaped base are not particularly limited and can be appropriately selected depending on the intended purpose. The sheet-shaped base has a quadrangular shape, a circular shape, etc. Also, the sheet-shaped base may have a single-layer structure, multi-layer structure, etc. The size of the sheet-shaped base may be appropriately selected depending on the intended purpose.

The sheet-shaped base may be, for example, a resin sheet, a rubber sheet, a synthetic paper, a metal sheet, a glass sheet or a composite thereof. Among them, a resin sheet is particularly preferred.

Examples of the resin sheet include polyethylene terephthalate (PET) sheets, polycarbonate sheets, polystyrene sheets and polymethyl methacrylate sheets. These may be used alone or in combination. Among them, polyethylene terephthalate (PET) sheets are particularly preferred.

The sheet-shaped base may be appropriately synthesized or may be a commercially available product.

The thickness of the sheet-shaped base is determined in the light of the depth of a concave portion in the case where the concave portion into which a convex-shaped electronic information recording module can be inserted, is formed on the sheet-shaped base. The thickness is preferably 20 μm to 300 μm, and more preferably 50 μm to 188 μm.

On the other hand, the thickness of the sheet-shaped base having no concave portion is preferably 25 μm to 100 μm, and more preferably 25 μm to 50 μm.

When the thickness is less than 25 μm, the curl preventing effect is decreased. When the thickness is more than 100 μm, the reversible thermosensitive recording medium becomes thick, impairing flexibility.

<<Concave Portion>>

An inner side surface of the concave portion is a tapered surface where the maximum opening diameter of the concave portion decreases from an opening edge of the concave portion towards a bottom surface of the concave portion.

The inner side surface of the concave portion is preferably a smooth tapered surface where the maximum opening diameter of the concave portion smoothly decreases from an opening edge of the concave portion towards a bottom surface of the concave portion.

The concave portion has preferably a depth of 20 nm to 260 nm.

When the inner side surface of the concave portion has the tapered surface as described above, remarkably excellent printing quality can be obtained, without involving white voids and image fading.

The shape of an opening of the concave portion viewed from above is not particularly limited and can be appropriately selected depending on the purpose, but is circular, ellipsoidal, quadrangular, rectangular, hexagonal, octagonal, etc.

The tapered surface may be linearly inclined with a predetermined angle, may be sequentially inclined with a plurality of different inclination angles, or may be inclined curvingly.

The tapered surface may also be a multi-step tapered surface including a plurality of tapered surfaces having different angles (for example, three or more tapered surfaces), or may be formed by a spindle-shaped curved surface whose inner diameter increases continuously (smoothly) towards the opening side of the axial direction from the bottom surface of the concave portion.

The inclination angle (taper angle) θ of the tapered surface is preferably 30° or lower, more preferably 5° to 20°, further preferably 8° to 15°. The taper angle θ which is more than 30° may result in formation of a gap between the concave portion and the first resin applied.

The taper angle θ, as used herein, refers to an angle formed by a horizontal surface on the bottom of a concave portion and a tapered surface of the concave portion (see FIGS. 3 to 9). In the case where the tapered surface includes a plurality of tapered surfaces or is a curved surface, in a cross section cut along an application direction axis of the first resin described below, the taper angle θ refers to an angle formed by a line connecting a contact point between a horizontal surface on the bottom of a concave portion and an inner side surface of the concave portion with a contact point between a horizontal surface of an opening of the concave portion and the inner side surface of the concave portion (see FIGS. 7 to 9).

The distance between the concave portion and the electronic information recording element in the width direction of the concave portion is not particularly limited and can be appropriately selected depending on the purpose, but is preferably 0 mm to 1.5 mm, more preferably 0 mm to 1.0 mm, and particularly preferably 0 mm to 0.5 mm. When the distance is more than 1.5 mm, white voids and image fading may occur.

The distance between the concave portion and the electronic information recording element in the width direction of the concave portion means that a width of an air space portion formed in the concave portion in the state where the electronic information recording element is inserted in the concave portion.

The distance between the concave portion and the electronic information recording element in the depth direction of the concave portion is not particularly limited, but the distance from the bottom of the concave portion to the top of the electronic information recording element is preferably 5 μm to 50 μm, and more preferably 10 μm to 30 μm. In these ranges, occurrence of unprinted image portion can be prevented.

When the distance is less than 5 μm, the electronic information recording element projects to the side of the sheet-shaped base, and an area surrounding the electronic information recording element may fail to develop color upon recording. When the distance is more than 50 μm, a concave shape is formed in the back surface due to the electronic information recording element, and an area surrounding the electronic information recording element may fail to develop color upon recording.

A method for producing the concave portion is not particularly limited and can be appropriately selected depending on the purpose. Examples thereof include a cutting process, a laser process, a press process and an etching process. The cutting process is particularly preferable because the concave portion can be efficiently formed with high precision.

In the cutting process, where the shape of the opening of the concave portion viewed from above is circular, the taper angle can be adjusted by changing the angle of a blade, which cuts out the concave portion while being rotated. Meanwhile, where the shape of the opening of the concave portion viewed from above is quadrangular, the tapered surface can be formed by cutting out the concave portion so as to be quadrangular, and then chamfering the outer circumferential edges of the formed quadrangle.

<Electronic Information Recording Module>

The electronic information recording module includes an electronic information recording element and antenna circuits both disposed on a module substrate and, if necessary, includes other members. The electronic information recording module is also provided between the first sheet-shaped base and the second sheet-shaped base, where the first resin layer is provided between the electronic information recording module and the sheet-shaped base having the concave portion and the second resin layer is provided between the electronic information recording module and the sheet-shaped base having no concave portion.

The electronic information recording module is not particularly limited and can be appropriately selected depending on the purpose. For example, the electronic information recording module has a module substrate (e.g., plastic film) and a coiled antenna circuit formed thereon. This coiled antenna circuit forms an LC resonance circuit together with a capacity element, and can receive an electric wave having a predetermined frequency and send information stored in an electronic information recording element to a source of the electric wave. In general, the communication frequency used may be appropriately selected from 125 kHz, 13.56 MHz, 2.45 GHz, 5.8 GHz (microwave) and the UHF band.

The method for forming the antenna circuit is not particularly limited and can be appropriately selected depending on the purpose, but includes, for example, a method by etching a metal film laminated on the circuit substrate; a method by winding a coated electrical wire (e.g., enamel wire) on the antenna circuit board; a method by printing conductive paste on the circuit substrate; and a method by embedding the antenna circuit in the substrate; or a method by laminating metal foil as the antenna circuit.

The antenna circuit is not particularly limited, and usually the thickness of a wiring portion in the antenna circuit is 5 μm to 30 μm, and the antenna circuit has concavo-convex portions depending on the presence and absence of the wiring. Thus, it is necessary to reduce printing defect, such as white voids, image fading caused by the concavo-convex portions.

Examples of the base material for forming the module substrate is not particularly limited and can be appropriately selected depending on the purpose, but include rigid-type materials such as paper phenol, glass epoxy and composites; flexible-type materials such as polyimides, polyesters, polypropylenes, polyethylenes, polystyrenes, nylon, polyethylene terephthalate (PET), paper and synthetic paper; and complex-type materials of the rigid-type materials and the flexible-type materials.

The thickness of the module substrate is not particularly limited and may be appropriately selected depending on the intended purpose. It is, however, preferably 15 μm to 100 μm from the viewpoint of making the reversible thermosensitive recording medium thin thereby improving the flexibility.

For example, when a metal foil serving as the antenna circuit is laminated on the module substrate, the metal foil is not particularly limited, and a copper foil, an aluminum foil, an iron foil etc. may be used, for example. Among these, an aluminum foil is preferable due to its excellence in cost and processability. The thickness is preferably 6 μm to 50 μm.

The shape of the module substrate is not particularly limited and may be appropriately selected depending on the intended purpose, but may be any shapes such as square, rectangular, circular, ellipsoidal, etc.

The thickness (height) of the electronic information recording element is not particularly limited and may be appropriately selected depending on the intended purpose. It is, however, preferably 200 μm or less, and more preferably 25 μm to 140 μm. In addition, to protect the electronic information recording element, a protective film such as a polyimide film, a polyester film, and paper can also be bonded on the electronic information recording element.

The thickness of the protective film is not particularly limited and may be appropriately selected depending on the intended purpose. The thickness is preferably 1 μm to 20 μm.

The commercially available electronic information recording module is not particularly limited and can be appropriately selected depending on the purpose. Examples thereof include inlet sheets available from, for example, UPM, OMRON, Alien Technology Corporation, Sony Corporation, FUJITSU LIMITED, Hitachi, Ltd. Texas Instruments Incorporated, Fujii Corporation, Dai Nippon Printing Co., Ltd., and TOPPAN PRINTING CO., LTD.

<First Resin Layer>

The first resin layer serves to bond the sheet-shaped base having the concave portion to the electronic information recording module, and fill a gap between the concave portion and the electronic information recording element. The first resin layer is formed in the gap so as to prevent formation of depression corresponding to the concave portion in an area on the surface of the reversible thermosensitive recording medium, and form and erase an image having excellent image quality.

The adhesive used for forming the first resin layer is not particularly limited and may be appropriately selected depending on the intended purpose. Examples of the adhesive material include urea resins, melamine resins, phenol resins, epoxy resins, vinyl acetate resins, vinyl acetate-acrylic copolymers, ethylene-vinyl acetate copolymers, acrylic resins, polyvinyl ether resins, vinyl chloride-vinyl acetate copolymers, polystyrene resins, polyester resins, polyurethane resins, polyamide resins, chlorinated polyolefin resins, polyvinyl butyral resins, acrylic acid ester copolymers, methacrylic acid ester copolymers, natural rubbers, synthetic rubbers, cyanoacrylate resins, silicone resins, styrene-isoprene-styrene block copolymers and EVA resins.

Among them, preferred are natural rubbers, synthetic rubbers, acrylic resins, silicone resins, polyurethane resins, styrene-isoprene-styrene block copolymers and EVA resins, with acrylic resins being particularly preferable.

The thickness of the first resin layer is preferably adjusted so that the shortest distance of the antenna circuit and the sheet-shaped base having the concave portion becomes 10 nm or more.

When the shortest distance is less than 10 nm, the concavo-convex shape of the antenna circuit influences on image formation, causing failure in color development, such as white voids, image fading and the like upon image formation. From this standpoint, the shortest distance is more preferably 15 μm or more, and particularly preferably 20 μm or more.

When the shortest distance is 10 μm, the concavo-convex portions of the antenna circuit can be compensated for. However when the shortest distance increases, the total thickness of the reversible thermosensitive recording medium becomes thicker, and a desired flexibility may not be obtained. Therefore, the maximum shortest distance is preferably 50 μm or less.

As stated above, the wiring portion of the antenna circuit has concavo-convex portions and a thickness of 5 μm to 30 μm.

In the present invention, the shortest distance is defined as the distance between the sheet-shaped base having the concave portion and the top surface of the wiring portion when they come the closest to each other.

The shortest distance can be measured in such a manner that the cross section near the wiring portion is polished, and the shape of the cross section is observed.

The thickness of the first resin layer in the concave portion is not particularly limited, and can be appropriately selected on the intended purpose. From the standpoint of the shortest distance, it is preferably 100 μm or less, more preferably 50 μm or less, and particularly preferably 30 μm or less.

The thickness of the resin layer is more than 100 μm, the total thickness of the reversible thermosensitive recording medium increases, and a desired flexibility may not be obtained.

A method for forming the first resin layer is not particularly limited, and can be appropriately selected on the intended purpose. Examples thereof include spin coating, spray coating, laminator coating, and roll coating. From the viewpoint of forming uniform thickness, roll coating is preferably used.

<Second Resin Layer>

The second resin layer bonds the second sheet-shaped base and the first sheet-shaped base.

The reversible thermosensitive recording medium is structured so as to embed the electronic information recording module between the first sheet-shaped base and the second sheet-shaped base, and the first sheet-shaped base and the second sheet-shaped base are bonded in such a manner that the module substrate is located between them.

The adhesive used for forming the second resin layer is not particularly limited, and can be appropriately selected depending on the intended purpose. For example, the materials exemplified as those for forming the first resin layer can be used.

As the material for forming the second resin layer, the same resin material as those used for forming the first resin layer is used, so that each resin layer can be easily formed at low cost.

However, the first resin layer preferably functions to strengthen mechanical strength of the electronic information recording module as a layer adjacent to the electronic information recording module. On the other hand, the second resin layer preferably functions to give flexibility to the reversible thermosensitive recording medium. To this end, each of the first resin layer and the second resin layer can be formed of different materials.

From such viewpoint, the elastic modulus of the first resin layer is preferably larger than that of the second resin layer.

Specifically, the elastic modulus of the first resin layer is preferably 500 MPa to 2,000 MPa, and more preferably 700 MPa to 1,000 MPa.

The elastic modulus of the second resin layer is 200 MPa to 1,000 MPa, and more preferably 250 MPa to 700 MPa.

<Other Layer>

The other layer is not particularly limited and can be appropriately selected depending on the intended purpose. For example, a back layer may be provided on the exposed surface of the second sheet-shaped base 1. A protective layer may also be provided on the exposed surface of the reversible thermosensitive recording layer. Between the protective layer and the reversible thermosensitive recording layer, an intermediate layer may be provided.

The back layer is provided for the purpose of preventing the reversible thermosensitive recording medium from curling.

The back layer may contain a resin cured using, for example, heat, a UV ray and electron beam (preferably, a UV ray). Examples of the resin curable using heat, UV ray, electron beam, etc. include those exemplified above in relation to formation of the reversible thermosensitive recording layer. Also, these resins can be cured as described in relation to formation of the reversible thermosensitive recording layer.

Notably, the back layer can be formed similar to formation of the reversible thermosensitive recording layer. Preferably, a coating liquid for the back layer is applied onto the sheet-shaped base so that the formed back layer can successfully compensate shrinkage of a surface of the sheet-shaped base on which surface the reversible thermosensitive recording layer is provided. Through this treatment, the reversible thermosensitive recording medium, which is obtained after all the layers have been formed, can be smoothed.

In addition to the resin, the back layer may contain an organic filler, an inorganic filler, a lubricant, a color pigment, an antistatic agent, a UV ray absorber etc.

Examples of the inorganic filler include carbonates, silicates, metal oxides and sulfuric acid compounds.

Examples of the organic filler include silicone resins, cellulose resins, epoxy resins, nylon resins, phenol resins, polyurethane resins, urea resins, melamine resins, polyesters, polycarbonates, styrene resins, acrylic resins, polyethylenes, formaldehyde resins and polymethyl methacrylates.

Examples of the UV ray absorber include compounds having a salicylate structure, a cyano acrylate structure, a benzotriazole structure or a benzophenon structure.

Examples of the lubricant include synthetic waxes, vegetable waxes, animal waxes, higher alcohols, higher fatty acids, esters of higher fatty acids, and amides.

The thickness of the back layer is preferably 0.1 μm to 10 μm.

The protective layer is provided for the purpose of protecting the reversible thermosensitive recording layer.

The protective layer is not particularly limited and may contain a resin cured using heat, a UV ray, electron beam, etc. Particularly preferred are resins cured using a UV ray or an electron beam.

Examples of resins curable using a UV ray (electron beam) include urethane acrylate oligomers, epoxy acrylate oligomers, polyester acrylate oligomers, polyether acrylate oligomers, vinyl oligomers and unsaturated polyester oligomers; and monofunctional or polyfunctional monomers such as acrylates, methacrylates, vinyl esters, ethylene derivatives and allyl compounds.

Notably, when a UV ray is used for crosslinking, a photopolymerization initiator and a photopolymerization accelerator are preferably used. Meanwhile, examples of the thermally-curable resin include those exemplified above in relation to formation of the reversible thermosensitive recording layer. Also, these resins can be cured as described in relation to formation of the reversible thermosensitive recording layer.

The thickness of the protective layer is preferably 0.1 μm to 10 μm.

The intermediate layer is provided for the purposes of improving adhesiveness between the reversible thermosensitive recording layer and the protective layer, of preventing degradation of the reversible thermosensitive recording layer by application of a coating liquid for the protective layer, and of preventing an additive contained in the protective layer from infiltrating into the reversible thermosensitive recording layer. Provision of the intermediate layer can improve image stability.

The intermediate layer may contain a thermoplastic resin and/or a resin cured using heat, a UV ray, electron beam, etc (thermosetting resin).

The thermosetting resin or thermoplastic resin is not particularly limited and can be appropriately selected depending on the intended purpose. Examples of the thermosetting resin or thermoplastic resin include polyethylenes, polypropylenes, polystyrenes, polyvinyl alcohols, polyvinyl butyrals, polyurethanes, saturated polyesters, unsaturated polyesters, epoxy resins, phenol resins, polycarbonates and polyamides.

Meanwhile, examples of the resin curable using heat, a UV ray, and electron beam, etc. is not particularly limited and include those exemplified above in relation to formation of the reversible thermosensitive recording layer.

Also, these resins can be cured as described in relation to formation of the reversible thermosensitive recording layer.

Notably, the intermediate layer can be formed similar to formation of the reversible thermosensitive recording layer.

If necessary, the intermediate layer may contain a filler, a UV ray absorber, etc.

The filler content of the intermediate layer is preferably 1% by volume to 95% by volume, more preferably 5% by volume to 75% by volume.

Meanwhile, the amount of the UV ray absorber contained in the intermediate layer is preferably 0.5% by mass to 10% by mass with respect to the resin.

The thickness of the intermediate layer is preferably 0.1 µm to 20 µm, more preferably 0.3 µm to 3 µm.

Also, the intermediate layer and/or protective layer, which are to be laminated over the reversible thermosensitive recording layer, preferably contain a resin having low oxygen permeability. This prevents a leuco dye and a color developer contained in the reversible thermosensitive recording layer from oxidization.

Also, an under layer may be provided between the reversible thermosensitive recording layer and the first sheet-shaped base. Provision of the under layer can improve sensitivity of color development of the reversible thermosensitive recording layer and adhesiveness between the reversible thermosensitive recording layer and the first sheet-shaped base.

Also, in order for the reversible thermosensitive recording layer to develop color through application of a laser light, a light-heat converting layer, which converts light to heat upon absorbing a laser light, may be provided over the reversible thermosensitive recording layer.

Furthermore, a heat insulating layer (e.g., air layer) may be provided over the reversible thermosensitive recording layer to prevent heat release.

The thus formed reversible thermosensitive recording medium of the present invention preferably has a total thickness of 150 µm to 500 µm, and more preferably 250 µm to 400 µm, and particularly preferably 270 µm to 300 µm.

When the total thickness is more than 500 µm, the flexibility is impaired and effect of close contacting with a head cannot be exhibited. Moreover, when the total thickness is 580 µm or more, jam occurs in a conveyance system of a printer.

When the total thickness is less than 150 µm, the medium is excessively thin, and the medium is not sufficiently pressed to a thermal head, causing printing defect.

The load for bending deformation, which indicates flexibility, of the reversible thermosensitive recording medium is not particularly limited and can be appropriately selected depending on the intended purpose. It is preferably less than 45 gf.

The load for bending deformation exhibiting the flexibility can be measured as follows.

Figure 18:
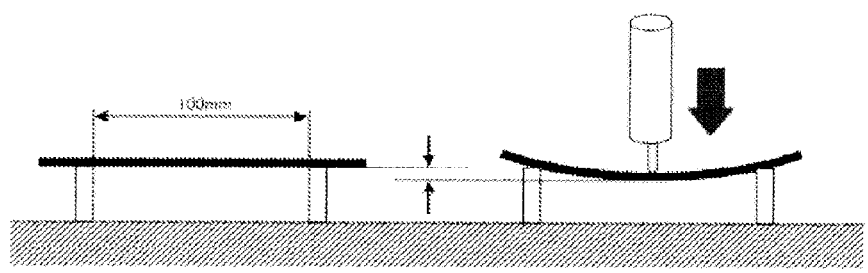
FIG. 18 is an explanatory diagram for a method of measuring flexibility of a reversible thermosensitive recording medium using a loading measurement device.

The amounts of deflection and load thereof were measured using a loading measurement device shown in FIG. 18 and a three-point bend method. Specifically, the reversible thermosensitive recording medium is supported at two points, while the distance therebetween is 10 mm in the cross sectional view, and the reversible thermosensitive recording medium is pressed at a center point thereof. When the amount of the deflection, which is the distance between the tips of the opposing arrows in this figure, is 10 mm, the load applied in the bold arrow direction is measured. The smaller the load is, the more flexible the thermosensitive recording medium is.

Hereinafter, the embodiments of the reversible thermosensitive recording medium of the present invention will be described.

First Embodiment

Figure 2:
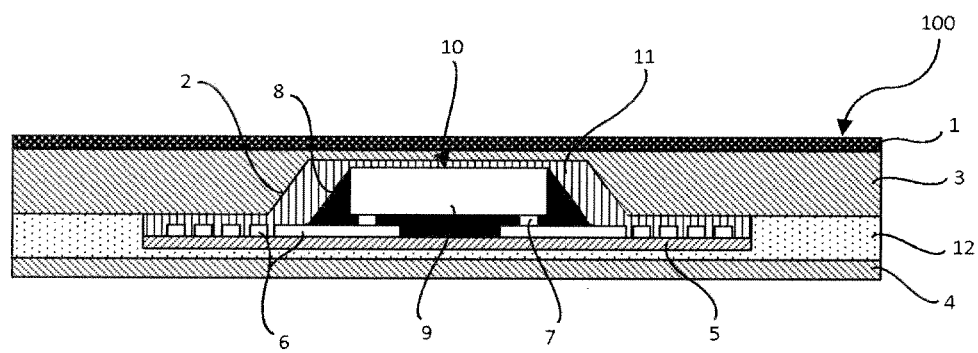
FIG. 2 is a schematic view showing a layer structure of a reversible thermosensitive recording medium according to the first embodiment of the present invention.

The reversible thermosensitive recording medium 100 according to an embodiment of the present invention will be explained with reference to FIG. 2.

This reversible thermosensitive recording medium 100 includes a first sheet-shaped base 3, which has a concave portion 2 having a trapezoidal cross section and formed on a surface opposite to a surface on which the reversible thermosensitive recording layer 1 is provided; a second sheet-shaped base 4 which is provided over a surface of the first sheet-shaped base 3 opposite to a surface thereof on which the reversible thermosensitive recording layer 1 is provided; and an electronic information recording module 10, which is provided between the first sheet-shaped base 3 and the second sheet-shaped base 4, and includes a module substrate 5, an antenna circuit 6 provided on the module substrate 5 and an IC chip 9 fixed on the module substrate 5 with a bump 7 and an underfill 8.

The first sheet-shaped base is bonded to an electronic information recording module 10 via a first resin layer 11, and the second sheet-shaped base is bonded to the first sheet-shaped base via the second resin layer 12.

Figure 3:
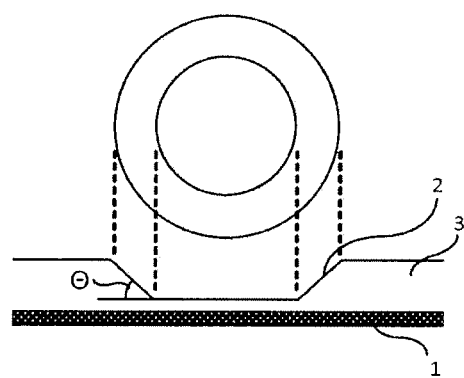
FIG. 3 is a conceptual view explaining a relationship between a cross-sectional shape of a concave portion in the first embodiment of the present invention viewed from a side in an application direction of a resin and a shape of the concave portion viewed from above an opening side.

FIG. 3 is a conceptual view explaining a relationship between a shape of a concave portion viewed from a side in an application direction of a resin and a counter-bored shape when the concave portion is viewed from above an opening side. In the first embodiment, the counter-bored shape is circular shape including ellipsoidal shape.

According to such reversible thermosensitive recording medium 100, the IC chip 9 is inserted into the concave portion 2, the first resin layer 11 is formed between the IC chip 9 and the concave portion 2, and thus a gap is less likely to be formed between the concave portion 2 and the first resin layer 11, which prevents the concavo-convex portions from being formed on the surface of the reversible thermosensitive recording layer 3 and allows good printing quality to be provided using a thermal head while keeping small the total thickness of the reversible thermosensitive recording medium 100.

Second to Seventh Embodiments

The reversible thermosensitive recording medium 100 according to each of the second to the seventh embodiments will be explained with reference to FIGS. 4 to 9. FIGS. 4 to 9 are each conceptual view explaining a relationship between a shape of a concave portion viewed from a side in an application direction of a resin and a counter-bored shape when the concave portion is viewed from above an opening side.

Figure 4:
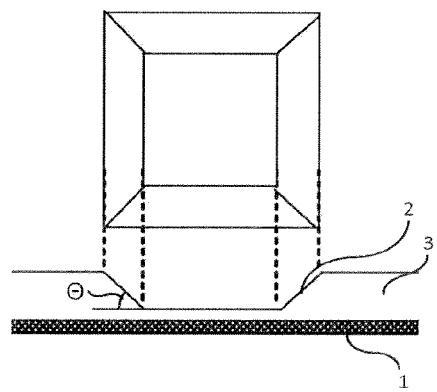
FIG. 4 is a conceptual view explaining a relationship between a cross-sectional shape of a concave portion in the second embodiment of the present invention viewed from a side in an application direction of a resin and a shape of the concave portion viewed from above an opening side.

In the second embodiment, the counter-bored portion has a square shape and all of four side surfaces of the concave portion are tapered surfaces (see FIG. 4).

Figure 5:
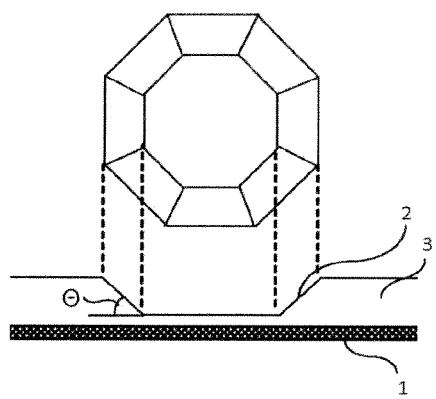
FIG. 5 is a conceptual view explaining a relationship between a cross-sectional shape of a concave portion in the third embodiment of the present invention viewed from a side in an application direction of a resin and a shape of the concave portion viewed from above an opening side.

In the third embodiment, the counter-bored portion has a polygonal shape and all of side surfaces of the concave portion are tapered surfaces (see FIG. 5).

Figure 6:
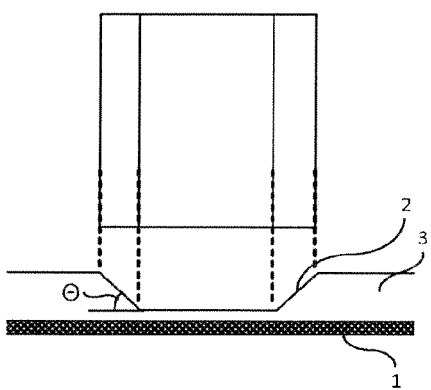
FIG. 6 is a conceptual view explaining a relationship between a cross-sectional shape of a concave portion in the fourth embodiment of the present invention viewed from a side in an application direction of a resin and a shape of the concave portion viewed from above an opening side.

In the fourth embodiment, the counter-bored portion has a square shape and two side surfaces of the concave portion crossing an application direction axis of the resin are tapered surfaces (see FIG. 6).

Figure 7:
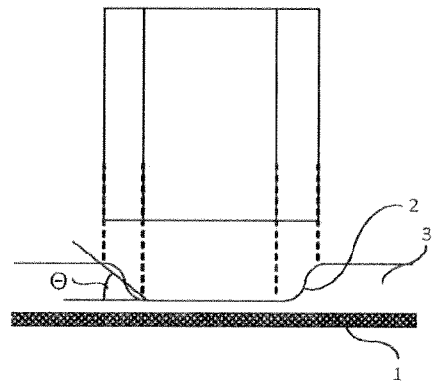
FIG. 7 is a conceptual view explaining a relationship between a cross-sectional shape of a concave portion in the fifth embodiment of the present invention viewed from a side in an application direction of a resin and a shape of the concave portion viewed from above an opening side.

In the fifth embodiment, the two tapered side surfaces according to the fourth embodiment are curved and inclined, i.e., have R (see FIG. 7).

Figure 8:
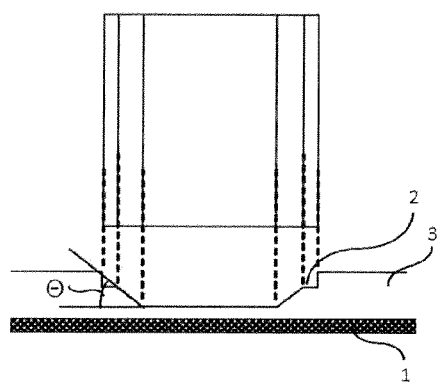
FIG. 8 is a conceptual view explaining a relationship between a cross-sectional shape of a concave portion in the sixth embodiment of the present invention viewed from a side in an application direction of a resin and a shape of the concave portion viewed from above an opening side.

In the sixth embodiment, the counter-bored portion has a square shape and the tapered side surfaces have a step (see FIG. 8).

Figure 9:
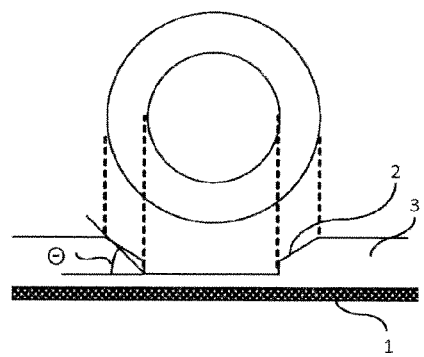
FIG. 9 is a conceptual view explaining a relationship between a cross-sectional shape of a concave portion in the seventh embodiment of the present invention viewed from a side in an application direction of a resin and a shape of the concave portion viewed from above an opening side.

In the seventh embodiment, the counter-bored portion has a circular shape, including an elliptical shape, and the tapered side surfaces have a step (see FIG. 9).

In these reversible thermosensitive recording media according to the second to the seventh embodiments, similar to the first embodiment, a gap is less likely to be left between the concave portion 2 and the first resin layer 11, which prevents the concavo-convex portions from being formed on the surface of the reversible thermosensitive recording layer 3 and allows good printing quality to be provided using a thermal head while keeping small the total thickness of the reversible thermosensitive recording medium 100.

Other than the above description, the detailed description of the reversible thermosensitive recording medium of the second to the seventh embodiments is the same as that of the first embodiment. Thus, the description thereof is omitted.

Eighth Embodiment

Figure 10:
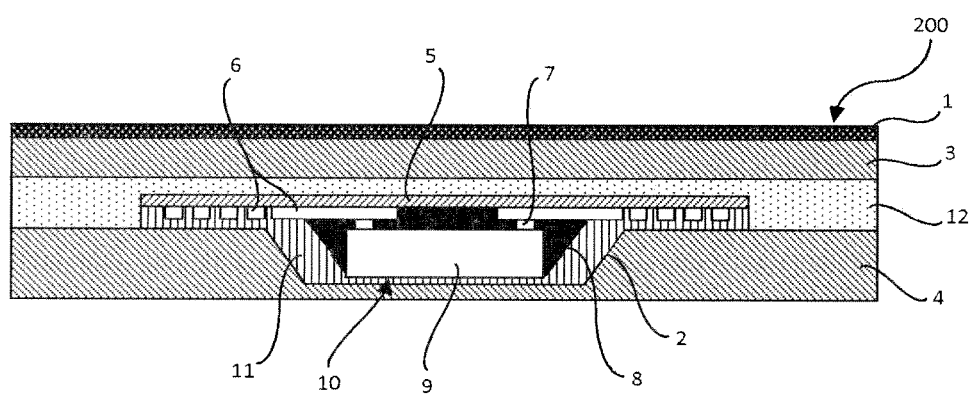
FIG. 10 is a schematic view showing a layer structure of a reversible thermosensitive recording medium according to the eighth embodiment of the present invention.

The reversible thermosensitive recording medium 200 according to an embodiment of the present invention will be explained with reference to FIG. 10.

This reversible thermosensitive recording medium 200 includes a first sheet-shaped base 3 which is provided in a surface of a reversible thermosensitive recording layer 1; a second sheet-shaped base 4 which is provided over a surface of the first sheet-shaped base 3 opposite to a surface thereof on which the reversible thermosensitive recording layer 1 is formed; a concave portion 2 which is provided in a surface of the second sheet-shaped base 4 and has a trapezoidal cross section; and an electronic information recording module 10, which is provided between the first sheet-shaped base 3 and the second sheet-shaped base 4, and includes a module substrate 5, an antenna circuit 6 provided on the module substrate 5 and an IC chip 9 fixed on the module substrate 5 with a bump 7 and an underfill 8.

The second sheet-shaped base 4 is bonded to an electronic information recording module 10 via a first resin layer 11, and the second sheet-shaped base is bonded to the first sheet-shaped base via the second resin layer 12.

The counter-bored portion has a circular shape, including an elliptical shape, when the concave portion is viewed from above on the opening side.

In such reversible thermosensitive recording medium 200, the IC chip 9 is inserted into the concave portion 2, and the first resin layer 11 is formed between the IC chip 9 and the concave portion 2. This structure prevents the concavo-convex portions from being formed on the surface of the reversible thermosensitive recording layer 3 and allows good printing quality to be provided using a thermal head while keeping small the total thickness of the reversible thermosensitive recording medium 200.

The modifications in which the shape of the concave portion 2 in the eighth embodiment is changed to that of each of the second to the seventh embodiments are also within the present invention.

(Method for Producing Reversible Thermosensitive Recording Medium)

A method for producing a reversible thermosensitive recording medium of the present invention includes a step of forming a reversible thermosensitive recording layer, a step of forming a concave portion, a step of forming a first resin layer, a step of providing an electronic information recording module, a step of forming a second resin layer and a bonding step, as necessary and further includes other steps.

<Step of Forming Reversible Thermosensitive Recording Layer>

The step of forming a reversible thermosensitive recording layer is a step of forming a reversible thermosensitive recording layer on a surface of a first sheet-shaped base.

A method for forming the reversible thermosensitive recording layer is not particularly limited, and can be appropriately selected depending on the intended purpose. The same method described in the reversible thermosensitive recording layer of the present invention can be employed as the method in the step of forming the reversible thermosensitive recording layer. Alternatively, the reversible thermosensitive recording layer has been preliminarily formed in a surface of the first sheet-shaped base may be used.

<Step of Forming Concave Portion>

The step of forming a concave portion is a step of forming a concave portion whose inner side surface is a tapered surface on a surface of a second sheet-shaped base or on a surface of the first sheet-shaped base opposite to a surface thereof on which the reversible thermosensitive recording layer is provided.

The reversible thermosensitive recording medium having the concave portion of such a shape is thin and has excellent flexibility while maintaining high bending durability and contact pressure resistance, and can prevent white voids and failure in color development at the time of repetitive image formation and erasure and prevent initial white voids and failure in color development upon performing image formation once, because a gap is less likely to be formed at the corner of the bottom surface of the concave portion when the resin is applied on the concave portion in the step of forming a first resin layer described below.

A method for forming a concave portion is not particularly limited, and can be appropriately selected depending on the intended purpose. For example, any of a cutting process, a laser process, a press process and an etching process is preferably used. By these processes, the concave portion can be formed into a desired dimension with high precision.

<Step of Forming First Resin Layer>

The step of forming a first resin layer is a step of forming a first resin layer on at least a portion of the surface on which the concave portion is formed and within the concave portion.

A method for forming the first resin layer is not particularly limited, and can be appropriately selected depending on the intended purpose. For example, a resin described in the reversible thermosensitive recording medium of the present invention can be applied to form the first resin layer and the resin is preferably applied along an inclination of a tapered surface of the concave portion. Accordingly, a gap is less likely to be formed at the corner of the bottom surface of the concave portion when the resin is applied to the concave portion, so that the reversible thermosensitive recording medium can be thin and have excellent flexibility while maintaining high bending durability and contact pressure resistance, and can prevent white voids and failure in color development at the time of repetitive image formation and erasure and prevent initial white voids and failure in color development upon performing image formation once.

A method for forming the first resin layer is not particularly limited, and can be appropriately selected on the intended purpose. Examples thereof include spin coating, spray coating, laminator coating, and roll coating. From the viewpoint of forming uniform thickness, roll coating is preferably used.

A method for forming the first resin layer is not particularly limited, and can be appropriately selected on the intended purpose. For example, the first resin layer is formed by applying a composition solution containing the adhesive, and then heating for adhesion.

<Step of Providing Electronic Information Recording Module>

The step of providing an electronic information recording module is a step of bonding the sheet-shaped base having a concave portion and an electronic information recording module containing an electronic information recording element and an antenna circuit on a module substrate via the first resin layer, and inserting the electronic information recording element into the concave portion so as to leave a gap between the first sheet-shaped base and the electronic information recording module in the depth direction of the concave portion thereby providing the electronic information recording module.

As the electronic information recording module, those described in the reversible thermosensitive recording medium of the present invention can be used.

A method for positioning the electronic information recording element upon inserting the electronic information recording element into the concave portion is not particularly limited. For example, a method for adjusting the transfer speed of the electronic information recording module arranged on a transfer roller so as to position the electronic information recording element with the concave portion is exemplified.

<Step of Forming Second Resin Layer>

The step of forming a second resin layer is a step of forming a second resin layer on a surface of either the first sheet-shaped base or the second sheet-shaped base which has no concave portion.

A method for forming the second resin layer is not particularly limited and can be appropriately selected depending on the intended purpose. For example, the resin described in the reversible thermosensitive recording medium of the present invention can be used to form the second resin layer.

<Bonding Step>

The bonding step is a step of bonding the sheet-shaped base having no concave portion to, via the second resin layer, the sheet-shaped base having the concave portion and the electronic information recording module so as to bond the sheet-shaped base to each other.

In the bonding step, a unit for bonding the first sheet-shaped base and the second sheet-shaped base is not particularly limited and can be appropriately selected depending on the intended purpose. Known bonding methods for bonding two sheets are exemplified.

Production Example 1

Hereinafter, a method for producing a reversible thermosensitive recording medium 100 according to the first embodiment of the present invention will be described with reference to FIG. 11.

Firstly, a first sheet-shaped base 3 provided on the reversible thermosensitive recording layer 1 is prepared, and a concave portion 2 having a trapezoidal cross section is formed by, for example, cutting out a surface of the first sheet-shaped base 3 opposite to a surface on which the reversible thermosensitive recording layer 1 is provided.

Next, a coating liquid for a first resin layer 11 is applied using, for example, an applicator 20 on the concave portion 2 and a surface of the first sheet-shaped base 3 on which the concave portion 2 has been formed.

Then, the first sheet-shaped base 3 is bonded to the electronic information recording module 10 via the first resin layer 11 so that the concave portion 2 receives the electronic information recording element 9 which is located on the electronic information recording module 10.

A coating liquid for a second resin layer 12 is applied onto a second sheet-shaped base 4.

Figure 11:
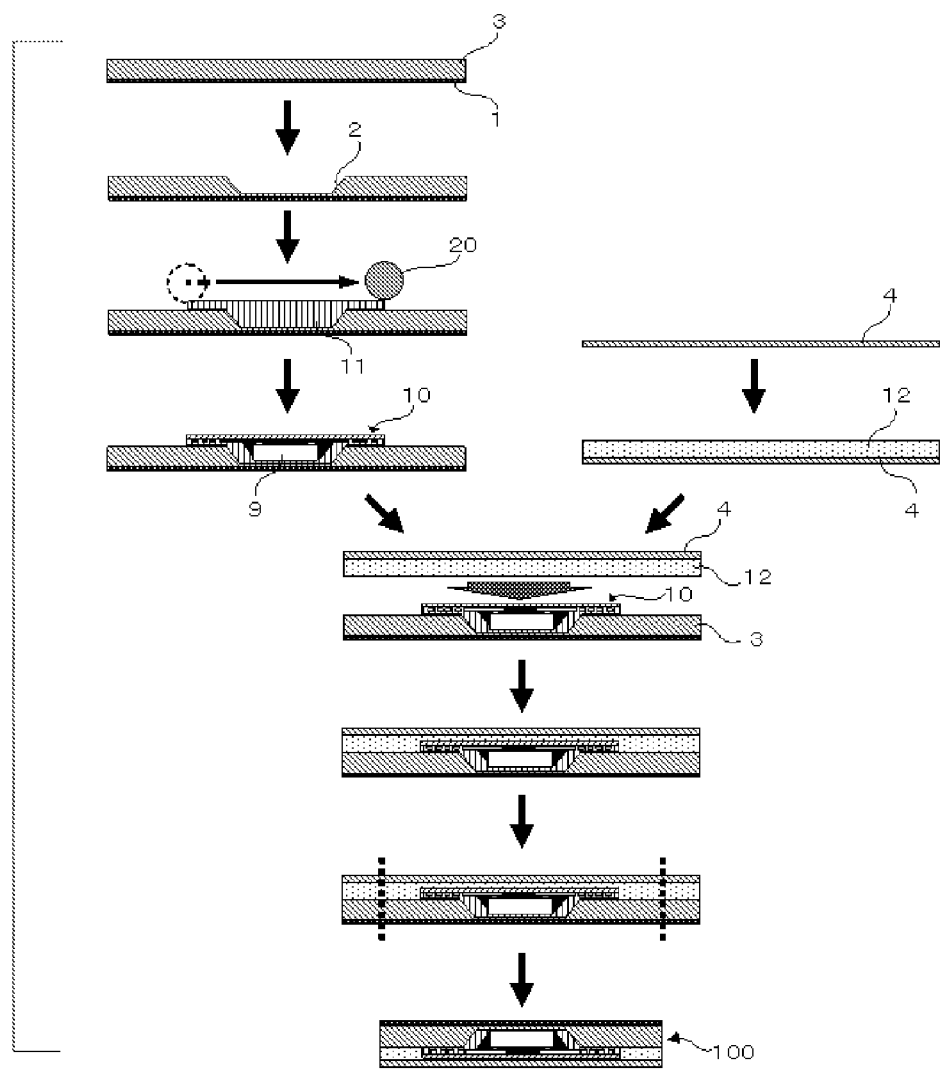
FIG. 11 is a schematic view showing a production process of a reversible thermosensitive recording medium according to the first embodiment of the present invention.

After the second sheet-shaped base 4 provided on the second resin layer 12 is bonded to the first sheet-shaped base 3 which has been previously bonded to the electronic information recording module 10, the resultant product is cut into the desired size along dashed lines shown in FIG. 11 to give the reversible thermosensitive recording medium 100.

Production Example 2

Hereinafter, a method for producing a reversible thermosensitive recording medium 200 according to the eighth embodiment of the present invention will be described with reference to FIG. 12.

Firstly, a second sheet-shaped base 4 is prepared, and a concave portion 2 having a trapezoidal cross section is formed by, for example, cutting out a surface of the second sheet-shaped base 4.

Next, a coating liquid for a first resin layer 11 is applied using, for example, an applicator 20 on the concave portion 2 and a surface of the second sheet-shaped base 4 on which the concave portion 2 has been formed.

Then, the second sheet-shaped base 4 is bonded to an electronic information recording module 10 via the first resin layer 11 so that the concave portion 2 receives the electronic information recording element 9 which is located on the electronic information recording module 10.

A first sheet-shaped base 3 provided on the reversible thermosensitive recording layer 1 is prepared, and a coating liquid for a second resin layer 12 is applied on a surface of the first sheet-shaped base 3 opposite to a surface on which the reversible thermosensitive recording layer 1 is provided.

Figure 12:
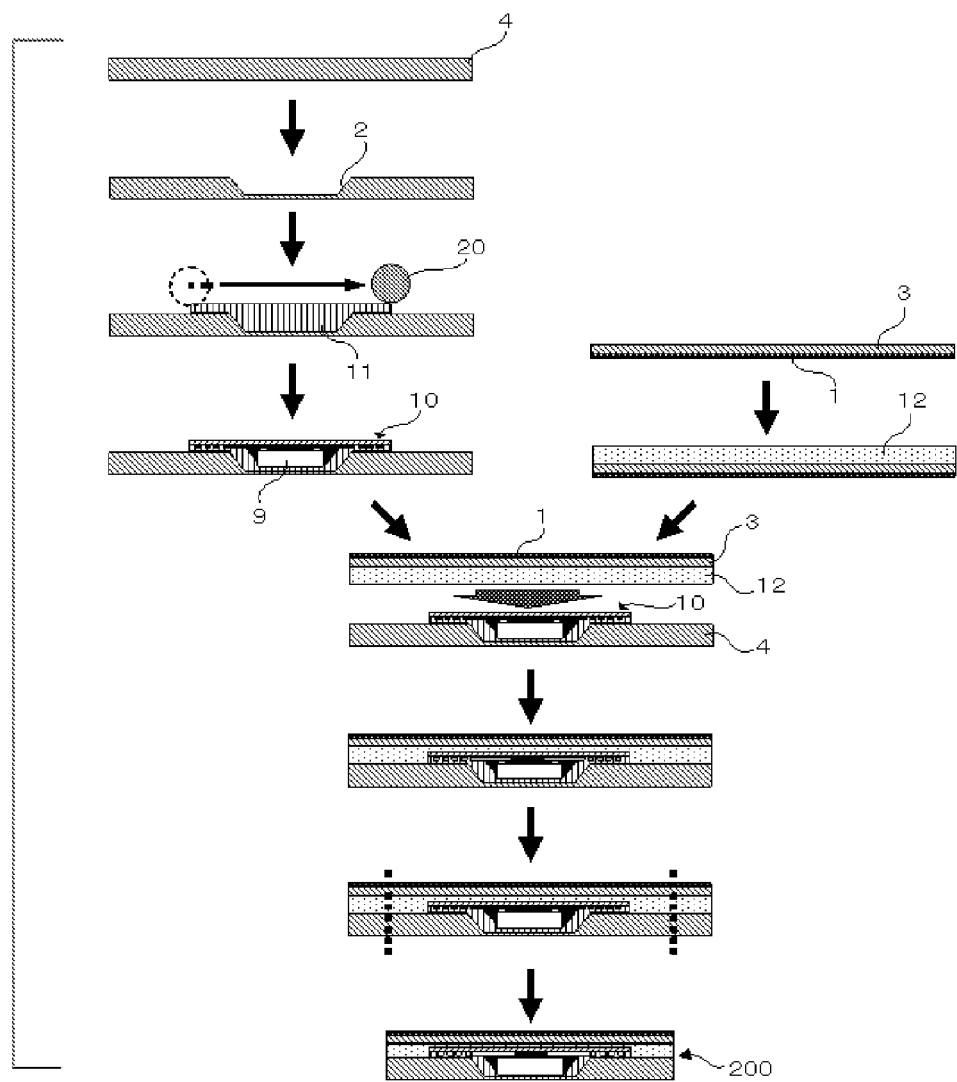
FIG. 12 is a schematic view showing a production process of a reversible thermosensitive recording medium according to the eighth embodiment of the present invention.

After the first sheet-shaped base 3 provided on the second resin layer 12 is bonded to the second sheet-shaped base 4 which has been previously bonded to the electronic information recording module 10, the resultant product is cut into the desired size along dashed lines shown in FIG. 12 to give the reversible thermosensitive recording medium 200.

Figure 13:
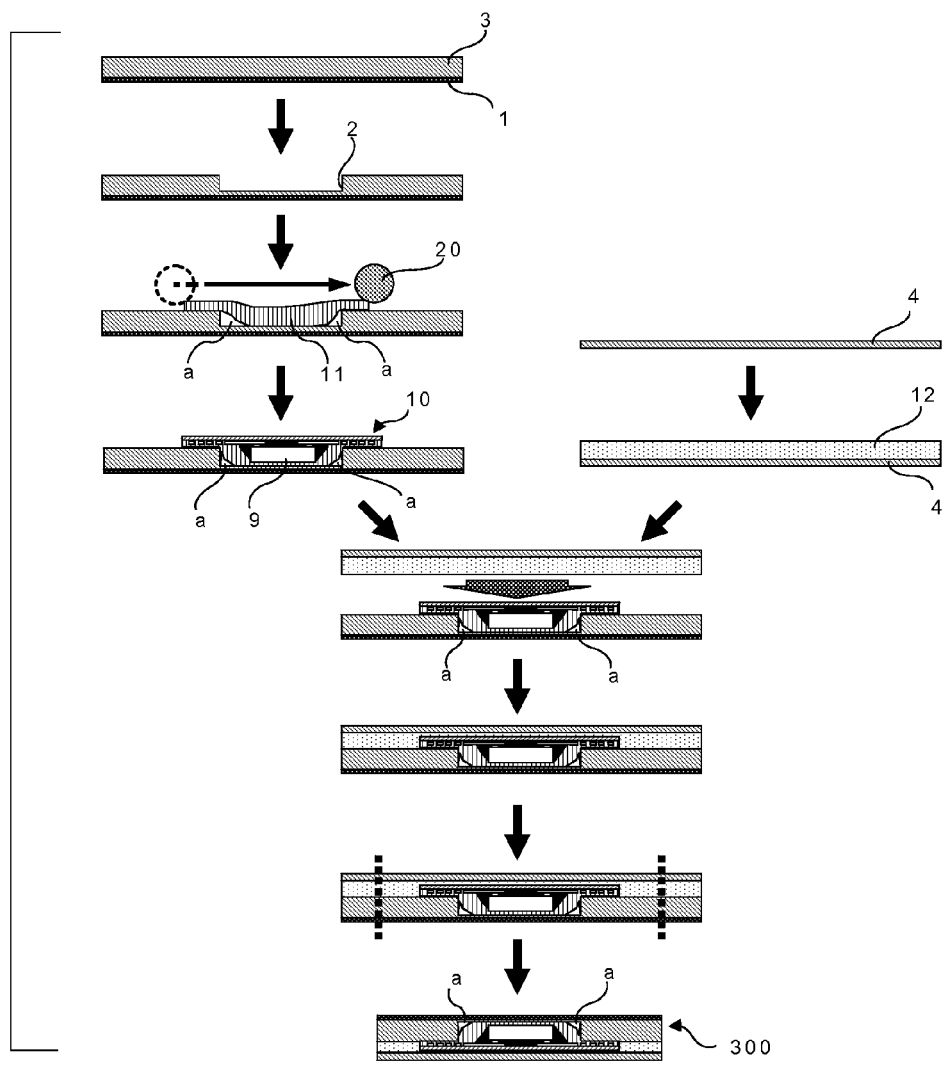
FIG. 13 is a schematic view showing a production process of a reversible thermosensitive recording medium according to the embodiment of the related art.

Hereinafter, a method for producing a reversible thermosensitive recording medium 200 according to the related art will be described with reference to FIG. 13 for comparison with a method of the present invention descried above.

Firstly, a first sheet-shaped base 3 provided on a reversible thermosensitive recording layer 1 is prepared, and a concave portion 2 having no tapered surface is formed by, for example, cutting out a surface of the first sheet-shaped base 3 opposite to a surface on which the reversible thermosensitive recording layer 1 is provided.

Next, a coating liquid for a first resin layer 11 is applied using, for example, an applicator 20 on the concave portion 2 and a surface of the first sheet-shaped base 3 on which the concave portion 2 has been formed.

Here, the coating liquid for the first resin layer 11 is applied on the concave portion 2 as the applicator moves, but the coating liquid for a first resin layer 11 is not filled sufficiently near both edges of the concave portion 2 in the application direction of the resin and thus gaps "a" are likely to be left.

In the case where the reversible thermosensitive recording medium 300 is produced using the same steps as the embodiments of the present invention following the above descriptions, gaps "a" are likely to be left under the reversible thermosensitive recording layer 3 within the concave portion 2.

When the resin within the concave portion 2 is cured and shrunk, a lack of the resin in the gap may cause a portion of the base just under the gap to deform and thus the surface of the reversible thermosensitive recording layer 1 to be depressed.

Depending on the type of the resin used, the resin may react with residual air within the gap and moisture in the residual air to generate gas within the gap, the resulting gas may press and protrude the reversible thermosensitive recording layer.

EXAMPLES

The present invention is further described below in detail with reference to the following examples. However, these should not be construed as limiting the scope of the invention.

Example 1

Figure 14:
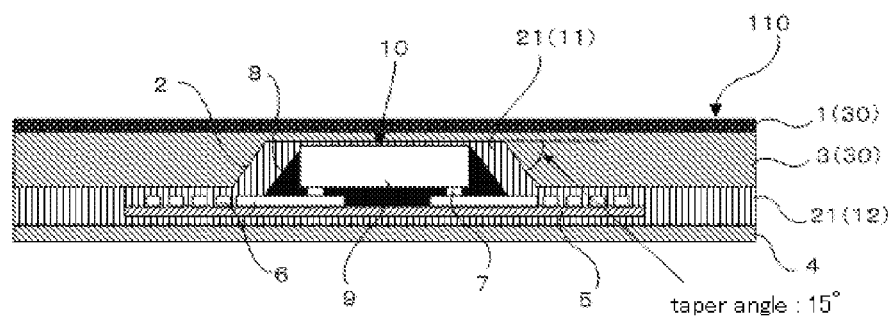
FIG. 14 is a schematic view showing a layer structure of a reversible thermosensitive recording medium of Example 1.

FIG. 14 is a cross sectional view of a reversible thermosensitive recording medium 110 according to Example 1.

There was provided a reversible thermosensitive recording sheet 30 (630BD, obtained from Ricoh Company, Ltd., thickness: 226 μm) including a reversible thermosensitive recording layer 1 which would turn into black and a polyethylene terephthalate (PET) sheet 3 having a thickness of 188 μm (corresponding to the first sheet-shaped base) where the reversible thermosensitive recording layer 1 was provided on the PET sheet 3. Then, a concave portion 2 (diameter of the bottom surface: 6 mm, depth: 150 μm, taper angle: 15°) was formed by cutting out a surface of the reversible thermosensitive recording sheet 30 opposite to a surface on which the reversible thermosensitive recording layer 1 was provided.

The concave portion was cut out using the milling device (MS330, obtained from Ruhlamat Automatisierungstechnik GmbH).

Next, a hot melt adhesive 21 (BONDMASTER 170-7310, obtained from Nippon NSC Ltd.) was applied by roll coating onto the concave portion 2—formed surface of the reversible thermosensitive recording sheet 30 so as to have a thickness of 15 μm measured on the flat surface.

Using the hot melt adhesive 21, an electronic information recording module 10 was bonded to the reversible thermosensitive recording sheet 30 by roll pressing so that an IC chip 9 could be contained in the concave portion 2 formed in the reversible thermosensitive recording sheet 30. Here, as the electronic information recording module 10, an electronic information recording module 10 (RKT132, obtained from Hitachi, Ltd.), which had a module substrate 5, an antenna circuit 6 provided on the module substrate 5 and an IC chip 9 fixed on the antenna circuit board with bump 7 and underfill 8 was used.

Then, a hot melt adhesive 21 (BOND MASTER 170-7310, obtained from Nippon NSC Ltd.) was applied in a thickness of 150 μm by roll coating onto a surface of a roll-shaped second PET sheet (second sheet-shaped base) 4 (CRISPER, obtained from Toyobo Co., Ltd., thickness: 38 μm). The applying device, the use condition thereof, the viscosity of the adhesive, etc. were the same as those previously described.

After the second PET sheet 4 onto which the hot melt adhesive 21 had been applied was bonded by roll pressing to the reversible thermosensitive recording sheet 30 to which the electronic information recording module 10 had been bonded, the resulting bonded sheet was cut into a desired size using a die cutting device to produce a reversible thermosensitive recording medium 110 of Example 1.

Example 2

Figure 15:
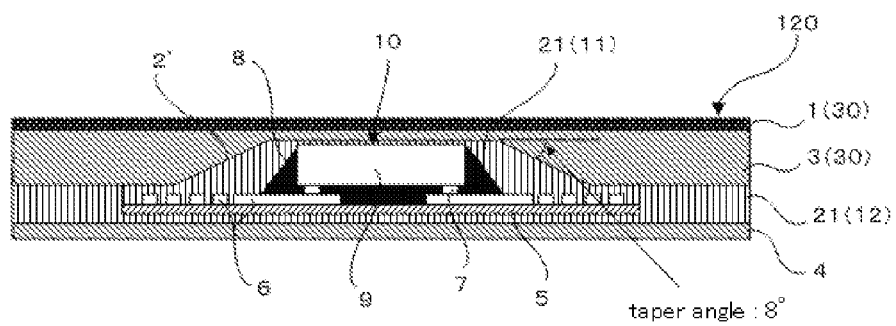
FIG. 15 is a schematic view showing a layer structure of a reversible thermosensitive recording medium of Example 2.

FIG. 15 is a cross sectional view of a reversible thermosensitive recording medium 120 according to Example 1.

A reversible thermosensitive recording medium of Example 2 was produced in the same manner as in Example 1, except that the concave portion 2' (diameter of the bottom surface: 6 mm, depth: 150 μm, taper angle: 8°) was formed by changing the angle of a blade in cutting out the surface of the reversible thermosensitive recording sheet 30 opposite to the surface on which the reversible thermosensitive recording layer 1 was provided.

Comparative Example 1

Figure 16:
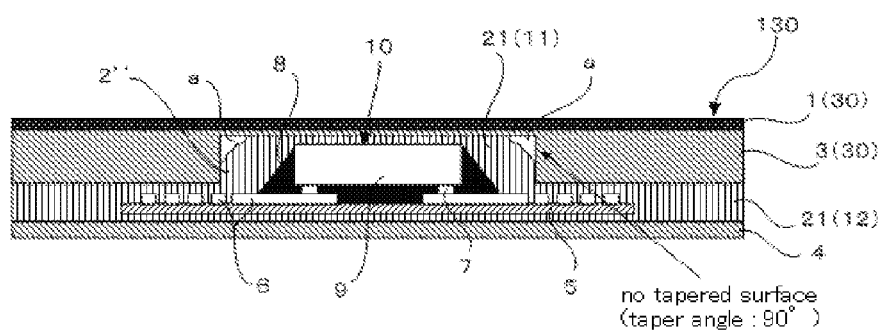
FIG. 16 is a schematic view showing a layer structure of a reversible thermosensitive recording medium of Comparative Example 1.

FIG. 16 is a cross sectional view of a reversible thermosensitive recording medium 130 according to Comparative Example 1.

A reversible thermosensitive recording medium of Comparative Example 1 was produced in the same manner as in Example 1, except that the concave portion 2" having no tapered surface (diameter of the bottom surface: 6 mm, depth: 150 μm) was formed by cutting out the surface of the reversible thermosensitive recording sheet 30 opposite to the surface on which the reversible thermosensitive recording layer 1 was provided.

Comparative Example 2

Figure 17:
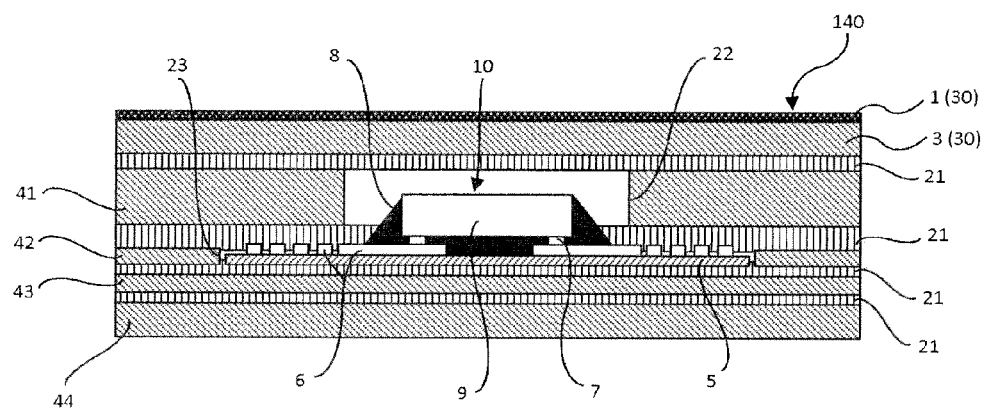
FIG. 17 is a schematic view showing a layer structure of a reversible thermosensitive recording medium of Comparative Example 2.

FIG. 17 is a cross sectional view of a reversible thermosensitive recording medium 140 according to Comparative Example 2.

The following were sequentially laminated via a hot melt adhesive 21 (BOND MASTER 170-7310, obtained from Nippon NSC Ltd.): a reversible thermosensitive recording sheet 30 (630BD, obtained from Ricoh Company, Ltd., thickness: 138 μm) including a reversible thermosensitive recording layer 1 which would turn into black and a PET sheet 3 (first sheet-shaped base) which was provided thereon with the reversible thermosensitive recording layer 1; a first sheet 41 having a through-hole 22 (diameter: 6 mm) into which a IC chip 9 could be inserted (CRISPER, obtained from Toyobo Co., Ltd., thickness: 188 μm); an electronic information recording module 10 including the IC chip 9 (RKT132, obtained from Hitachi, Ltd.); a second sheet 42 having a hollowed-out portion 23 into which the electronic information recording module 10 could be contained (CRISPER, obtained from Toyobo Co., Ltd., thickness: 50 μm); a third sheet 43 (CRISPER, obtained from Toyobo Co., Ltd., thickness: 75 μm); and a base sheet 44 (CRISPER, obtained from Toyobo Co., Ltd., thickness: 100 μm).

In this reversible thermosensitive recording medium 140, on the first sheet 41, the second sheet 42 containing the entirety of the module substrate 5 in the hollowed-out portion 23 is formed and the IC chip 9 protruding towards the reversible thermosensitive recording sheet 30 of the electronic information recording module 10 was inserted into the through-hole 22 of the first sheet 41.

That is, the reversible thermosensitive recording sheet 30, the first sheet 41, the second sheet 42 containing the entirety of the electronic information recording module 10 in the hollowed-out portion 23, the third sheet 43, and the base sheet 44 were laminated in the order described above.

<Measuring Method and Evaluation Method>

In reversible thermosensitive recording media 110, 120, 130, and 140 according to Examples 1 and 2, and Comparative Examples 1 and 2, the shape of a concave portion (depth, diameter of the bottom surface, and taper angle), thickness, concavo-convex shape in the surface, flexibility, and color development were measured and evaluated as follows. The results are shown in Table 1A and 1B.

<<Measurement of Shape (Depth, Diameter of Bottom Surface, and Taper Angle) of Concave Portion>>

The shape (depth, diameter of the bottom surface, and taper angle) of the concave portion of each of reversible thermosensitive recording media 110, 120, 130, and 140 was determined with a laser microscope (VK-8500, obtained from KEYENCE CORPORATION). Specifically, the shape of the concave portion was scanned, then a cross-sectional profile was extracted from the obtained image by drawing straight lines and curved lines on the image, and the obtained cross-sectional profile was used to determine the shape of the concave portion.

<<Measurement of Thickness>>

The total thickness of each of reversible thermosensitive recording media 110, 120, 130, and 140 was measured with an electric micrometer (K-35, obtained from Anritsu Corporation).

<<Measurement of Concavo-convex Shape on Surface>>

A concavo-convex shape on a surface of each of reversible thermosensitive recording media 110, 120, 130, and 140 was measured with a surface roughness meter (SURFCOM 750A-3D, obtained from TOKYO SEIMITSU CO., LTD.).

<<Evaluation of Flexibility>>

Each of reversible thermosensitive recording media 110, 120, 130, and 140 was bent by a three-point bend method, and the amount of deflection and load thereof were measured using a loading measurement device shown in FIG. 18. Specifically, the reversible thermosensitive recording medium was supported at two points, while the distance therebetween was 10 mm in the cross sectional view, and the reversible thermosensitive recording medium was pressed at a center point thereof. When the amount of the deflection became 10 mm the load was measured. The flexibility was evaluated according to the following evaluation criteria. The smaller the load was, the more flexible the thermosensitive recording medium was.

—Evaluation Criteria—
A: The load was less than 45 gf.
B: The load was 45 gf or more.

<<Evaluation of Color Development>>

In the entire surface of each of reversible thermosensitive recording media 110, 120, 130, and 140, the image density of a solid image formed using a thermal printer (RP-K, obtained from SINFONIA TECHNOLOGY CO., LTD.) was measured with X-Rite938 (product of X-Rite Co.) at or near the concave portion at the first image formation and after repeating image formation and erasure 300 times, and the color development of the printed image was evaluated according to the following evaluation criteria.

—Evaluation Criteria for the First Image Formation—
A: The image density was 1.1 or higher, and good color development (no unprinted portions were observed)
B: The image density was less than 1.1, and bad color development (portions having low density (unprinted portions) remained in the area corresponding to the concave portion)

—Evaluation Criteria after 300 Times Repeated Image Formation/Erasure—
A: The image density was 0.8 or higher, and good color development (no unprinted portions were observed)
B: The image density was less than 0.8, and bad color development (portions having low density (unprinted portions) remained in the area corresponding to the concave portion)

TABLE 1A

| | Shape of concave portion | | |
| --- | --- | --- | --- |
| | Depth (μm) | Diameter of bottom surface (mm) | Taper angle (°) |
| Ex. 1 | 150 | 6 | 15 |
| Ex. 2 | 150 | 6 | 8 |
| Comp. Ex. 1 | 150 | 6 | None |
| Comp. Ex. 2 | Through-hole | 6 | None |

TABLE 1B

| | Properties of reversible thermosensitive recording media | | | | | |
| --- | --- | --- | --- | --- | --- | --- |
| | Concavo-convex Shape on Surface | Presence of gaps in concave portion | Thickness (mm) | Flexibility (gf) | Color development at the first image formation | Color development after repeated image formation/erasure |
| Ex. 1 | <5 μm | No | 0.38 | 30, A | 1.3, A | 1.0, A |
| Ex. 2 | <5 μm | No | 0.38 | 30, A | 1.3, A | 1.0, A |
| Comp. Ex. 1 | >10 μm | Yes | 0.38 | 30, A | 0.9, B | 0.7, B |
| Comp. Ex. 2 | <5 μm | Unfilled | 0.56 | 200, B | 0.9, B | 0.7, B |

Figure 19A:
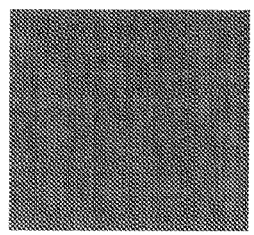
FIG. 19A is a view showing a state where no failure in color development occurs in a solid printing on a reversible thermosensitive recording layer in Example 1.
Figure 19B:
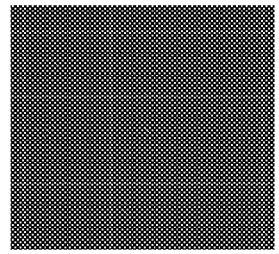
FIG. 19B is a view showing a state where no failure in color development occurs in a solid printing on a reversible thermosensitive recording layer in Example 2.
Figure 19C:
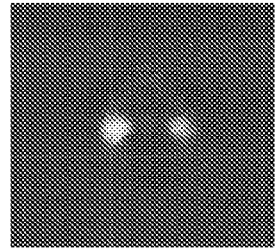
FIG. 19C is a view showing a state where failure in color development, such as white voids, image fading, etc. occurs in a solid printing on a reversible thermosensitive recording layer in Comparative Example 1.

Color development of the printed image in the reversible thermosensitive recording medium of Comparative Example 1 was evaluated and failure in color development was observed in an outer circumferential portion of the concave portion shown in FIG. 19C. This is likely because the gaps "a" where the hot melt adhesive 21 was not filled were left in an outer circumferential portion of the bottom surface of the concave portion, when the hot melt adhesive 21 was applied on the concave portion 2 in the production process of the reversible thermosensitive recording medium (see FIG. 13). When the hot melt adhesive 21 within the concave portion 2 was cured and shrunk, a lack of the hot melt adhesive 21 in the gap deformed the first sheet-shaped base 3 just under the gap and thus depressed the surface of the reversible thermosensitive recording layer 1. Accordingly, a thermal head insufficiently came into contact with the surface of the reversible thermosensitive recording medium, and thus heat was not sufficiently conducted in the surface thereof. As a result, the reversible thermosensitive recording medium could not be rapidly cooled, causing failure in color development.

Figure 19D:
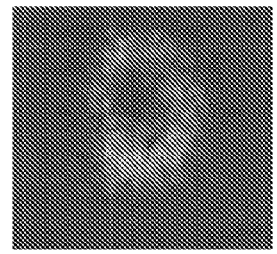
FIG. 19D is a view showing a state where failure in color development, such as white voids, image fading, etc. occurs in a solid printing on a reversible thermosensitive recording layer in Comparative Example 2.
Figure 20A:
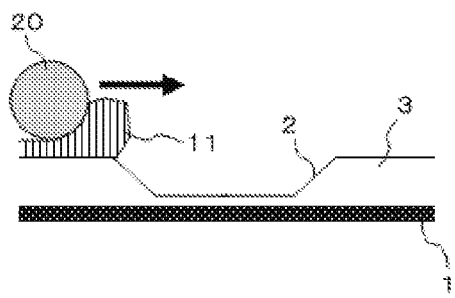
FIGS. 20A to 20D are each schematic view showing a step of applying a resin using an applicator on a concave portion 2 of a first sheet-shaped base 3 in the present invention.
Figure 20B:
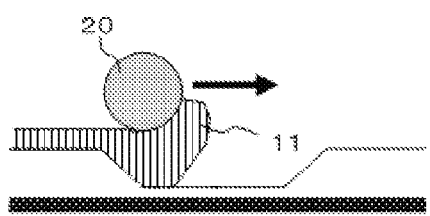
Figure 20C:
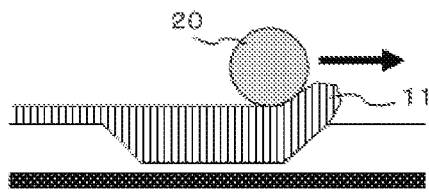
Figure 20D:
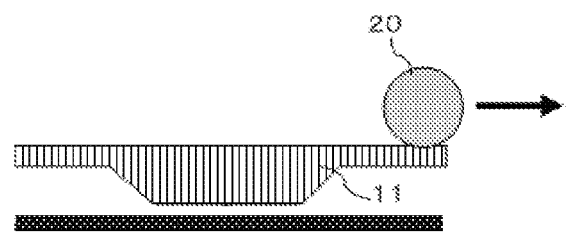

Color development of the printed image in the reversible thermosensitive recording medium of Comparative Example 2 was evaluated, failure in color development was observed in the entirety of the area having the through-hole 22 shown in FIG. 19D. This is likely because the through-hole 22 portion under the reversible thermosensitive recording layer 1 was not filled with the resin at all, and thus heat was not sufficiently conducted in the surface thereof due to the heat insulating effect of air. As a result, the reversible thermosensitive recording medium could not be rapidly cooled, causing failure in color development.

Meanwhile, for Examples 1 and 2, no failure in color development was observed even in the concave portion as well as after repetitive image formation and erasure shown in FIGS. 19A and 19B. This is likely because the concave portion of the reversible thermosensitive recording media according to Examples 1 and 2 had tapered side surfaces and thus no gap was left at the corner of the bottom surface of the concave portion when the hot melt adhesive 21 was applied on the concave portion (see FIGS. 20A to 20D).

Embodiments of the Present Invention are as Follows:

<1> A reversible thermosensitive recording medium including:
  a reversible thermosensitive recording layer;
  a first sheet-shaped base;
  a second sheet-shaped base;
  a first resin layer;
  a second resin layer; and
  an electronic information recording module containing a module substrate and an electronic information recording element and an antenna circuit which are disposed on the module substrate;
  wherein the reversible thermosensitive recording layer is provided adjacent to the first sheet-shaped base;
  wherein the first sheet-shaped base or the second sheet-shaped base has a concave portion in which the electronic information recording element is disposed in a depth direction of the first sheet-shaped base or the second sheet-shaped base,
  wherein the electronic information recording module is provided between the first sheet-shaped base and the second sheet-shaped base, where the first resin layer is provided between the electronic information recording module and the sheet-shaped base having the concave portion and the second resin layer is provided between the electronic information recording module and the sheet-shaped base having no concave portion, and
  wherein an inner side surface of the concave portion is a tapered surface where the maximum opening diameter of the concave portion decreases from an opening edge of the concave portion towards a bottom surface of the concave portion.

<2> The reversible thermosensitive recording medium according to <1>, wherein the inner side surface of the concave portion is a smooth tapered surface where the maximum opening diameter of the concave portion smoothly decreases from the opening edge of the concave portion towards the bottom surface of the concave portion.

<3> The reversible thermosensitive recording medium according to <1> or <2>, wherein an inclination angle of the tapered surface is 30° or lower.

<4> The reversible thermosensitive recording medium according to any one of <1> to <3>, wherein the sheet-shaped base having the concave portion is the first sheet-shaped base.

<5> A method for producing a reversible thermosensitive recording medium including:
  forming a reversible thermosensitive recording layer on a surface of a first sheet-shaped base;
  forming a concave portion an inner side surface of which is a tapered surface on a surface of a second sheet-shaped base or on a surface of the first sheet-shaped base opposite to the surface thereof on which the reversible thermosensitive recording layer is formed;
  forming a first resin layer on at least a part of the surface on which the concave portion is formed and within the concave portion;
  bonding the sheet-shaped base having the concave portion to, via the first resin layer, an electronic information recording module containing a module substrate and an electronic information recording element and an antenna circuit which are disposed on the module substrate, and inserting the electronic information recording element into the concave portion so as to leave a gap in a depth direction of the concave portion thereby providing the electronic information recording module;
  forming a second resin layer on the sheet-shaped base having no concave portion of the first sheet-shaped base and the second sheet-shaped base; and
  bonding the sheet-shaped base having no concave portion to, via the second resin layer, the sheet-shaped base having the concave portion and the electronic information recording module so as to bond the sheet-shaped base to each other.

<6> The method for producing a reversible thermosensitive recording medium according to <5>, wherein the sheet-shaped base having the concave portion is the first sheet-shaped base.

<7> The method for producing a reversible thermosensitive recording medium according to <5> or <6>, wherein, in the forming the first resin layer, a resin is applied along the inclination of the tapered surface of the concave portion.

<8> The method for producing a reversible thermosensitive recording medium according to any one of <5> to <7>, wherein an inclination angle of the tapered surface is 30° or lower.

<9> The method for producing a reversible thermosensitive recording medium according to any one of <5> to <8>, wherein, in the forming the concave portion, the concave portion is formed through a cutting process, a laser process, a press process or an etching process.

A reversible thermosensitive recording medium of the present invention is thin and has excellent flexibility without breaking the electronic information recording module, causes neither failure in color development after repetitive image formation and erasure nor failure in color development upon the first image formation, and thus can be widely used, as a reversible thermosensitive recording medium having an electronic information recording module (IC chip), for example, as gateway tickets and as stickers for frozen food containers, industrial products, drug containers, in logistics, and process management.

This application claims priority to Japanese application No. 2011-031238, filed on Feb. 16, 2011, and incorporated herein by reference.

What is claimed is:

1. A reversible thermosensitive recording medium comprising:
  a reversible thermosensitive recording layer;
  a first sheet-shaped base;
  a second sheet-shaped base;
  a first resin layer;
  a second resin layer; and
  an electronic information recording module containing a module substrate and an electronic information recording element and an antenna circuit which are disposed on the module substrate;
  wherein the reversible thermosensitive recording layer is provided adjacent to the first sheet-shaped base;
  wherein the first sheet-shaped base or the second sheet-shaped base has a concave portion in which the electronic information recording element is disposed in a depth direction of the first sheet-shaped base or the second sheet-shaped base, wherein the electronic information recording module is provided between the first sheet-shaped base and the second sheet-shaped base, where the first resin layer is provided between the electronic information recording module and the sheet-shaped base having the concave portion and the second resin layer is provided between the electronic information recording module and the sheet-shaped base having no concave portion, and wherein an inner side surface of the concave portion is a tapered surface where the maximum opening diameter of the concave portion decreases from an opening edge of the concave portion towards a bottom surface of the concave portion.

2. The reversible thermosensitive recording medium according to claim 1, wherein the inner side surface of the concave portion is a smooth tapered surface where the maximum opening diameter of the concave portion smoothly decreases from the opening edge of the concave portion towards the bottom surface of the concave portion.

3. The reversible thermosensitive recording medium according to claim 1, wherein an inclination angle of the tapered surface is 30° or lower.

4. The reversible thermosensitive recording medium according to claim 1, wherein the sheet-shaped base having the concave portion is the first sheet-shaped base.

5. A method for producing a reversible thermosensitive recording medium comprising:

forming a reversible thermosensitive recording layer on a surface of a first sheet-shaped base;

forming a concave portion an inner side surface of which is a tapered surface on a surface of a second sheet-shaped base or on a surface of the first sheet-shaped base opposite to the surface thereof on which the reversible thermosensitive recording layer is formed;

forming a first resin layer on at least a part of the surface on which the concave portion is formed and within the concave portion;

bonding the sheet-shaped base having the concave portion to, via the first resin layer, an electronic information recording module containing a module substrate and an electronic information recording element and an antenna circuit which are disposed on the module substrate, and inserting the electronic information recording element into the concave portion so as to leave a gap in a depth direction of the concave portion thereby providing the electronic information recording module;

forming a second resin layer on the sheet-shaped base having no concave portion of the first sheet-shaped base and the second sheet-shaped base; and bonding the sheet-shaped base having no concave portion to, via the second resin layer, the sheet-shaped base having the concave portion and the electronic information recording module so as to bond the sheet-shaped base to each other.

6. The method for producing a reversible thermosensitive recording medium according to claim 5, wherein the sheet-shaped base having the concave portion is the first sheet-shaped base.

7. The method for producing a reversible thermosensitive recording medium according to claim 5, wherein, in the forming the first resin layer, a resin is applied along the inclination of the tapered surface of the concave portion.

8. The method for producing a reversible thermosensitive recording medium according to claim 5, wherein an inclination angle of the tapered surface is 30° or lower.

9. The method for producing a reversible thermosensitive recording medium according to claim 5, wherein, in the forming the concave portion, the concave portion is formed through a cutting process, a laser process, a press process or an etching process.

* * * * *

UNITED STATES PATENT AND TRADEMARK OFFICE
CERTIFICATE OF CORRECTION

Page 1 of 1

PATENT NO. : 8,541,339 B2
APPLICATION NO. : 13/372806
DATED : September 24, 2013
INVENTOR(S) : Koji Yamaguchi, Noboru Koga and Takeshi Owashi It is certified that error appears in the above-identified patent and that said Letters Patent is hereby corrected as shown below:

On the Title Page

Replace the date of patent, with the following:

-- (45) "*Sep. 24, 2013" --

Replace the notice on the cover page of the patent, with the following:

-- (*) "Notice: Subject to any disclaimer, the term of this patent is extended or adjusted under 35 U.S.C. 154(b) by 0 days. This patent is subject to a terminal disclaimer." --

Signed and Sealed this
Fourth Day of March, 2014

Michelle K. Lee
*Deputy Director of the United States Patent and Trademark Office*